(12) United States Patent
Vasefi et al.

(10) Patent No.: US 12,523,643 B2
(45) Date of Patent: Jan. 13, 2026

(54) SYSTEM AND METHOD FOR ASSESSING BIOLOGICAL TISSUE

(71) Applicant: SafetySpect Inc., Grand Forks, ND (US)

(72) Inventors: Fartash Vasefi, Sherman Oaks, CA (US); Kenneth Edward Barton, Palm City, FL (US); Nicholas Bennett MacKinnon, Salt Spring Island (CA); Abdolrahim Zandi, Laguna Niguel, CA (US); Kouhyar Tavakolian, Grand Forks, ND (US)

(73) Assignee: SafetySpect Inc., Grand Forks, ND (US)

( * ) Notice: Subject to any disclaimer, the term of this patent is extended or adjusted under 35 U.S.C. 154(b) by 355 days.

(21) Appl. No.: 17/966,860

(22) Filed: Oct. 16, 2022

(65) Prior Publication Data
US 2024/0027417 A1    Jan. 25, 2024

Related U.S. Application Data

(63) Continuation-in-part of application No. 17/681,568, filed on Feb. 25, 2022, now Pat. No. 11,885,788.
(Continued)

(51) Int. Cl.
*G01N 33/12* (2006.01)
*G01N 21/49* (2006.01)
(Continued)

(52) U.S. Cl.
CPC .............. *G01N 33/12* (2013.01); *G01N 21/49* (2013.01); *G01N 21/55* (2013.01); *G01N 21/645* (2013.01);
(Continued)

(58) Field of Classification Search
CPC ........ G01N 33/12; G01N 21/49; G01N 21/55; G01N 21/645; G01N 21/65;
(Continued)

(56) References Cited

U.S. PATENT DOCUMENTS

| 11,885,788 B2 * | 1/2024 | Farkas ................. G01N 21/645 |
| 2010/0330578 A1 * | 12/2010 | Duhr .................... B01L 3/50273 |
| | | 422/82.08 |
| 2021/0363579 A1 * | 11/2021 | Daugharthy ......... C12Q 1/6869 |

FOREIGN PATENT DOCUMENTS

WO    WO 2018165577 A1 *    9/2018    .............. A61P 29/00

* cited by examiner

*Primary Examiner* — Tung S Lau
(74) *Attorney, Agent, or Firm* — Jason T. Daniel, Esq.; Daniel Law Offices, P.A.

(57) ABSTRACT

A system for assessing biological tissue is disclosed. The system contains an illumination hardware arrangement comprising transmission and sensing hardware, the illumination hardware arrangement configured to inspect a biological tissue using at least two modes from a group containing: a three dimensional stereo imaging mode; a fluorescence imaging mode; a reflectance imaging mode; and a thermal imaging mode; and processing hardware configured to operate the illumination hardware arrangement according to a protocol comprising inspection settings of the at least two modes, wherein the processing hardware receives scan results for the at least two modes from the illumination hardware arrangement and identifies attributes of the biological tissue by constructing a three dimensional dataset from the scan results for the at least two modes and analyzing the three dimensional dataset.

16 Claims, 21 Drawing Sheets

Related U.S. Application Data which is a continuation of application No. 16/358,531, filed on Mar. 19, 2019, now Pat. No. 11,280,777.

(60) Provisional application No. 63/256,571, filed on Oct. 16, 2021.

(51) Int. Cl.
*G01N 21/55* (2014.01)
*G01N 21/64* (2006.01)
*G01N 21/65* (2006.01)
*G06N 20/00* (2019.01)

(52) U.S. Cl.
CPC ....... *G01N 21/65* (2013.01); *G01N 2201/127* (2013.01); *G06N 20/00* (2019.01)

(58) Field of Classification Search
CPC ..... G01N 2201/127; G01N 2021/1734; G01N 2021/1738; G01N 2021/3595; G01N 2021/479; G01N 2201/0221; G01N 21/4738; G01N 21/6456; G01N 21/94; G01N 21/359; G01N 21/3563; G06N 20/00; G06N 3/045

See application file for complete search history.

SYSTEM AND METHOD FOR ASSESSING BIOLOGICAL TISSUE

CROSS REFERENCE TO RELATED APPLICATIONS

This application is a continuation-in-part of U.S. patent application Ser. No. 17/681,568 titled "Apparatus and Method for Multimode Analytical Sensing of Items Such as Food" filed Feb. 25, 2022, which is incorporated herein by reference in its entirety. The U.S. patent application Ser. No. 17/681,568 is a continuation of U.S. patent application Ser. No. 16/358,531 titled "Apparatus and Method for Multimode Analytical Sensing of Items Such as Food" filed Mar. 19, 2019, now issued U.S. Pat. No. 11,280,777, which is incorporated herein by reference in its entirety. The U.S. patent application Ser. No. 16/358,531 is based upon provisional patent application of U.S. Ser. No. 62/645,514 filed Mar. 20, 2018, which is incorporated herein by reference in its entirety. This nonprovisional patent application is based upon provisional patent application, U.S. Ser. No. 63/256,571 filed Oct. 16, 2021, which is hereby incorporated by reference in its entirety.

FIELD

The present subject matter, in general is directed to a system and method for assessing biological tissue and more particularly, is directed to a non-invasive imaging system and method for assessing biological tissue.

BACKGROUND

Diabetic wounds in the US affect more than 8.2 million patients annually with an estimated economic burden of $28 billion (USD). Diabetic wounds are a growing concern due to the obesity epidemic and the attendant rise in type 2 diabetes. Ulcers are a common complication of diabetes. Up to 34% of people diagnosed with diabetes will develop a lower extremity ulcer at some point in their lifetime. Standard treatment for diabetic wounds includes debridement of necrotic tissue, infection control with topical dressings, mechanical off-loading, and management of blood glucose levels. If wounds do not adequately heal with standard treatment for diabetic care, additional interventions may be required including venous surgical intervention. Treatment selection depends largely upon the treating provider's subjective impression of the state of the wound, the non-invasive assessment of vascularity by techniques including but not limited to ankle/brachial indices, oximetry, toe pressures, non-invasive Doppler vascular studies, and whether a wound seems to be making progress or not based on change in size, which can be difficult to measure accurately in irregularly shaped wounds and which can vary depending on the person measuring them.

Unfortunately, features with significance to wound development may be unintentionally omitted due to the subjectivity of a clinician's diagnosis, and abnormalities may be revealed only after irreversible changes have occurred during later stages of diabetes. Current treatment of non-healing wounds involves pressure reduction to prevent further ischemia, improved nutrition, and bedside wound care with topical antibiotics, debridement, and dressings to limit infection. A major obstacle in improving wound-healing treatment regimens is a lack of objective physiological and biochemical markers able to be used to assess status of the wound and the effectiveness of treatment.

Thus, there is a need to better understand wound physiology using specialized tools that have been designed to measure underlying tissue changes and evaluate wound status to guide wound dressing selection and frequency of change.

SUMMARY

According to some embodiments, there is provided a biological sample inspection apparatus, comprising an illumination hardware arrangement comprising transmission and sensing hardware, the illumination hardware arrangement configured to inspect a biological sample using at least two modes from a group comprising a fluorescence imaging mode, a reflectance imaging mode, a scattering imaging mode, and a Raman imaging mode, and processing hardware configured to operate the illumination hardware arrangement according to a protocol comprising inspection settings of the at least two modes. According to some embodiments, the processing hardware receives scan results from the illumination hardware arrangement and identifies attributes of the biological sample. The processing hardware may be configured to employ the attributes of at least one biological sample to alter the protocol.

According to some embodiments, there is provided a method for inspecting at least one biological sample, comprising determining a plurality of inspection modes for inspecting the at least one biological sample using a multimode inspection apparatus, determining an inspection protocol for inspecting the at least one biological sample, wherein the inspection protocol comprises inspection settings for the plurality of inspection modes, inspecting at least one biological sample using the multimode inspection apparatus according to the protocol, and altering the protocol based on inspection results for multiple biological samples.

According to some embodiments, there is provided a biological sample inspection apparatus configured to inspect a biological sample for issues, comprising illumination hardware comprising transmission and sensing hardware configured to illuminate and sense attributes of the biological sample, the illumination hardware configured to inspect the biological sample using multiple inspection configurations from at least one of a fluorescence imaging mode, a reflectance imaging mode, a scattering imaging mode, and a Raman imaging mode, and processing hardware configured to operate the illumination hardware according to a protocol comprising inspection settings for the multiple inspection configurations, wherein the processing hardware receives scan results from the illumination hardware and identifies attributes of the biological sample. The processing hardware may be configured to employ the attributes of at least one biological sample and alter the protocol based on the attributes of the one biological sample.

Generally speaking, pursuant to the various embodiments, according to one aspect, a system for assessing biological tissue is presently disclosed. The system comprises an illumination hardware arrangement comprising transmission and sensing hardware, the illumination hardware arrangement configured to inspect a biological tissue using at least two modes from a group of modes. The group of modes are a three dimensional stereo imaging mode; a fluorescence imaging mode; a reflectance imaging mode; and a thermal imaging mode. The system further comprises processing hardware configured to operate the illumination hardware arrangement according to a protocol comprising inspection settings of the at least two modes, wherein the processing hardware receives scan results for the at least two modes from the illumination hardware arrangement and identifies attributes of the biological tissue by constructing a three dimensional dataset from the scan results for the at least two modes and analyzing the three dimensional dataset. According to another aspect, the biological tissue being assessed by the system is a wound on a patient's skin. According to another aspect, the processing hardware of the system comprises a processor, at least one trained artificial intelligence module, and at least one classifier. According to another aspect, the biological tissue being assessed by the system is a burn on a patient's skin. According to another aspect, the protocol of the system is determined in part based on an identification of particular attributes expected to be associated with the biological tissue when examined using the at least two modes. According to another aspect, the system determines presence of infection associated with the biological tissue. According to another aspect, the attributes identified by the system are infection associated with the biological tissue. According to another aspect, the attributes identified by the system are metabolic biomarkers associated with the biological tissue. According to another aspect, the illumination hardware of the system comprises one or more pulsating light sources to reduce ambient light sources for the at least two modes. According to another aspect, the attributes identified by the system are collagen associated with the biological tissue. According to another aspect, the attributes identified by the system are oxygenation associated with the biological tissue. According to another aspect, the system identifies treatment based on the three dimensional dataset. According to another aspect, the system identifies billing code based on the three dimensional dataset. According to another aspect, the system identifies treatment based on the three dimensional dataset. According to another aspect, the system classifies the wound based on the three dimensional dataset. According to another aspect, the system classifies the burn based on the three dimensional dataset.

These and other advantages of the present invention will become apparent to those skilled in the art from the following detailed description of the invention and the accompanying drawings.

Figure 1:
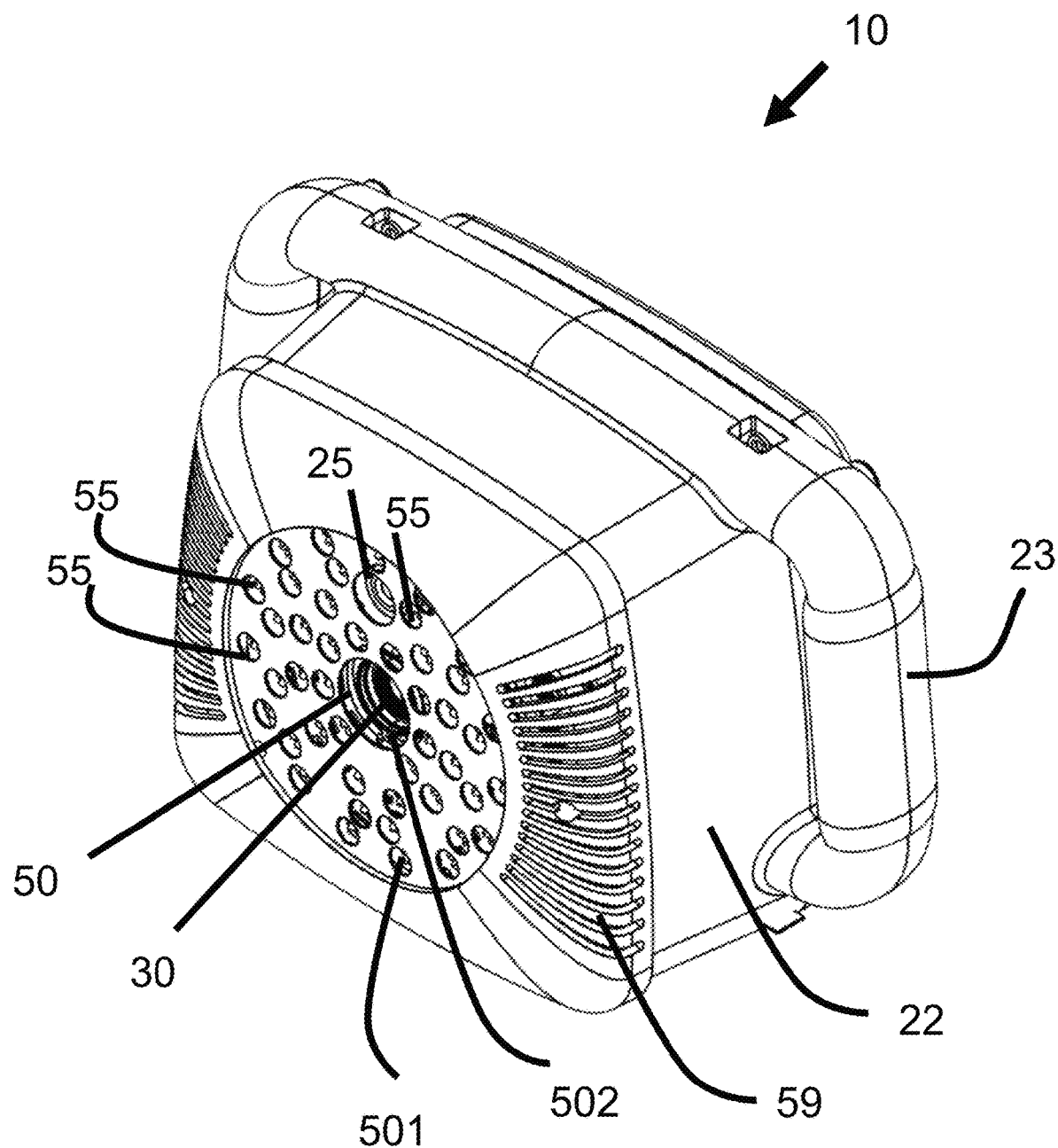
FIG. 1 depicts a front perspective view of a device according to some embodiments presently disclosed.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

According to some embodiments, presently disclosed system and method may be used to evaluate biological tissue, such as, for example, burn(s) on patient's skin, subdermal tissue, bone tissue, wound on patient's skin, wound on patient's skin caused by diabetes, and/or any other aspects of patient's organs. According to some embodiments, presently disclosed system and method may be used to detect and/or identify one or more aspects of the biological tissue. For example, the presently disclosed system and method may be used to: analyze collagen content in a patient's skin, analyze collagen content in the patient's subdermal tissue, identify presence of an infection on the patient's skin, identify type of infection present on the patient's skin, identify presence of an infection in the patient's subdermal tissue, identify type of infection present in the patient's subdermal tissue, identify presence of blood vessels for perfusion, identify oxygen content in the patient's skin, identify oxygen content in the patient's subdermal tissue, identify size of a burn on patient's skin, identify size of a wound on patient's skin, identify presence of necrotic tissue on patient's skin, identify presence of necrotic tissue in the patient's subdermal tissue, identify presence of bone tissue in patient's wound, identify type of subdermal tissue that is visible in patient's wound, identify presence of fat tissue in patient's wound, analyze collagen content in the biological tissue, analyze collagen content in the biological tissue, identify presence of an infection on the biological tissue, identify type of infection present on the biological tissue, identify presence of an infection in the biological tissue, identify type of infection present in the biological tissue, identify presence of blood vessels for perfusion in the biological tissue, identify oxygen content in the biological tissue, identify size of the biological tissue, identify presence of necrotic tissue on the biological tissue, identify presence of necrotic tissue in the biological tissue, identify presence of bone tissue in the biological tissue, identify type of subdermal tissue that is visible in the biological tissue, and/or identify presence of fat tissue in the biological tissue. According to some embodiments, presently disclosed system and method may classify burns as electrical burns or chemical burns based on different biomarkers on the biological tissue.

Figure 2:
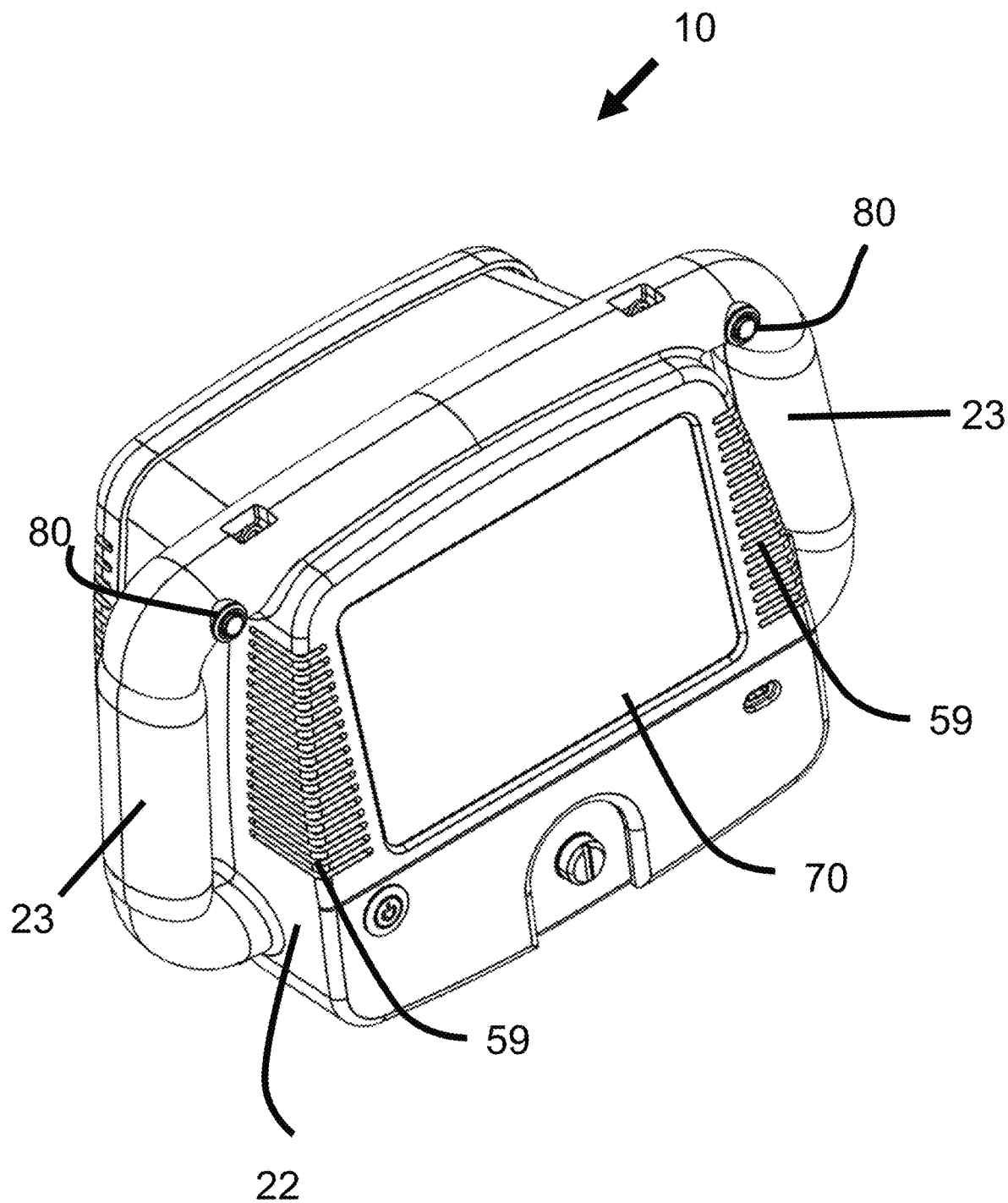
FIG. 2 depicts a rear perspective view of the device in FIG. 1.
Figure 3:
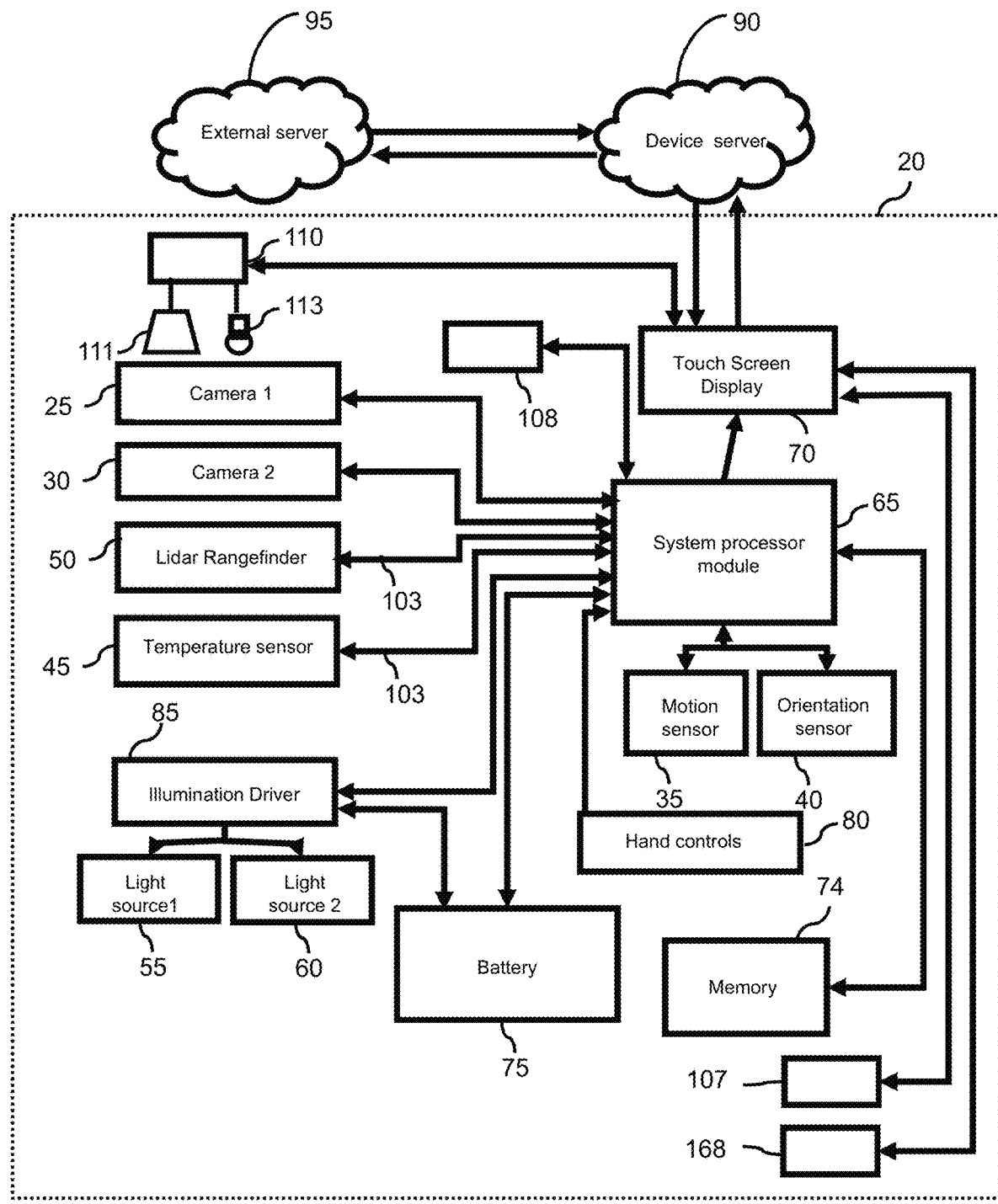
FIG. 3 depicts a block diagram of a device according to some embodiments presently disclosed.

Referring to FIGS. 1-2, a device 10 is shown according to some embodiments presently disclosed. Referring to FIG. 3, a block diagram 20 is shown according to some embodiments presently disclosed. The block diagram 20 depicts some of the components of the device 10 and how they communicate with one another. According to some embodiments presently disclosed, the device 10 is a handheld device. According to some embodiments presently disclosed, the device 10 is part of non-invasive imaging system and method for assessing biological tissue.

According to some embodiments presently disclosed, an operator (i.e. user, medical professional, technician) uses the device 20 to collect images of the biological tissue.

According to some embodiments presently disclosed, the device 10 comprises a housing 22 with one or more handles 23. According to some embodiments, the housing 22 of the device 10 comprises additional materials for ruggedization or to provide drop/impact resistance.

According to some embodiments presently disclosed, the device 10 comprises a memory 74 (which may comprise one or more computer readable storage mediums). The memory 74 may comprise high-speed random-access memory and/or non-volatile memory, such as one or more magnetic disk storage devices, flash memory devices, or other non-volatile solid-state memory devices. Access to memory 74 by other components of the device 10, such as one or more system processor modules 65 and a peripherals interface, may be controlled by a memory controller (not shown).

According to some embodiments presently disclosed, the device 10 comprises one or more system processor modules 65. The one or more system processor modules 65 run or execute various software programs and/or sets of instructions stored in memory 74 to perform various functions for the device 10 and to process data. The system processor module 65 may also comprise orientation sensors, motion sensors, global positioning systems, wireless communication systems such as WiFi or Bluetooth systems, cellular network communications systems such 4G, LTE or 5G or similar systems. The system processor module 65 may use these systems to communicate with a device server 90 or it may communicate with the device server via a wired connection through a peripheral interface. The system processor module 65 may also use these systems to communicate with other wireless devices such as cell phones, tablets, smart glasses, other inspection devices or other smart displays as well as RFID systems, barcode readers, fingerprint readers, etc. According to some embodiments, some or all of these components may be implemented on a single chip. According to some embodiments, some or all of these components may be implemented on separate chips.

According to some embodiments presently disclosed, the device 10 comprises an audio circuitry 110, a speaker 111, and a microphone 113. The audio circuitry 110, the speaker 111, and the microphone 113 provide an audio interface between a user (i.e. operator) and the device 10. The audio circuitry 110 receives audio data, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to one or more system processor modules 65 for processing. Audio data may be retrieved from and/or transmitted to memory 74. The audio circuitry 110 may also comprise a headset/speaker jack (not shown). The headset jack provides an interface between the audio circuitry 110 and removable audio input/output peripherals, such as speaker, output-only headphones and/or a headset with both output (e.g., a headphone for one or both ears) and input (e.g., a microphone).

According to some embodiments presently disclosed, the device 10 comprises a display 70. The display 70 may be a touch-sensitive display 70. The touch-sensitive display 70 is sometimes called a "touch screen" for convenience, and may also be known as or called a touch-sensitive display system. In one embodiment, the touch-sensitive touch screen 70 provides an input interface and an output interface between the device 10 and the user. The touch screen 70 is configured to implement virtual or soft buttons and one or more soft keyboards. A display controller receives and/or sends electrical signals from/to the touch screen 70. The touch screen 70 displays visual output to the user. The visual output may include graphics, text, icons, video, and any combination thereof (collectively termed "graphics"). In some embodiments, some or all of the visual output may correspond to user-interface objects, further details of which are described below.

The touch screen 70 has a touch-sensitive surface, sensor or set of sensors that accepts input from the user based on haptic and/or tactile contact. The touch screen 70 and the display controller (along with any associated modules and/or sets of instructions in memory 74) detect contact (and any movement or breaking of the contact) on the touch screen 70 and converts the detected contact into interaction with user-interface objects (e.g., one or more soft keys, icons, web pages or images) that are displayed on the touch screen. In one embodiment, a point of contact between a touch screen 70 and the user corresponds to a finger of the user.

The touch screen 70 may use LCD (liquid crystal display) technology, or LPD (light emitting polymer display) technology, although other display technologies may be used in other embodiments. The touch screen 70 and the display controller may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch screen 70.

A touch-sensitive display in some embodiments of the touch screen 70 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 70 displays visual output from the portable device 10, whereas touch sensitive tablets do not provide visual output.

A touch-sensitive display in some embodiments of the touch screen 70 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

The touch screen 70 may have a resolution of 100 dpi. to 350 dpi. The user may make contact with the touch screen 70 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In addition to the touch screen 70, the device 10 may comprise a touchpad (not shown) for activating or deactivating particular functions. The touchpad is a touch-sensitive area of the device that, unlike the touch screen, does not display visual output. The touchpad may be a touch-sensitive surface that is separate from the touch screen 70 or an extension of the touch-sensitive surface formed by the touch screen.

The one or more system processor modules 65 may be configured to communicate with the smart display 70 to provide information to the user during an inspection or to accept instructions from the operator during an inspection. According to some embodiments, the smart display 70 may be a passive device such as a touch screen display. According to some embodiments, the smart display 70 may be an active device with multiple processing and communication capabilities such as a smartphone or tablet. If the smart display 70 is an active device some of the system software functions may be shared between the one or more system processor modules 65 and the smartphone or tablet. According to some embodiments, the smart display 70 is a smartphone.

The device 10 may also comprise a radio frequency (RF) circuitry 108. The RF circuitry 108 may be configured to receive and transmit RF signals, also called electromagnetic signals. The RF circuitry 108 converts electrical signals to/from electromagnetic signals and communicates with communications networks and other communications devices via the electromagnetic signals. The RF circuitry 108 may include circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document. According to some embodiments, the radio frequency (RF) circuitry 108 allows the device 10 to communicate with a device server 90 and/or an external server 95.

The device 10 may also comprise a physical or virtual click wheel (not show) and/or one or more controls 80 as an input control device. The user may navigate among and interact with one or more graphical objects (henceforth referred to as icons) displayed in the screen 70 by rotating the click wheel or by moving a point of contact with the click wheel (e.g., where the amount of movement of the point of contact is measured by its angular displacement with respect to a center point of the click wheel) or by activating the one or more controls 80. The click wheel may also be used to select one or more of the displayed icons. For example, the user may press down on at least a portion of the click wheel or an associated button. User commands and navigation commands provided by the user via the click wheel may be processed by an input controller as well as one or more of the modules and/or sets of instructions in memory 74. For a virtual click wheel, the click wheel and click wheel controller may be part of the touch screen 70 and the display controller, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

According to some embodiments presently disclosed, the device 10 comprises a power system 75. The power system 75 powers various components of the device 10. The power system 75 may comprise a power management system, one or more power sources (e.g., battery, alternating current (AC)), a recharging system, a power failure detection circuit, a power converter or inverter, a power status indicator (e.g., a light-emitting diode (LED)) and/or any other components associated with the generation, management and distribution of power in portable devices.

According to some embodiments presently disclosed, the device 10 comprises an optical sensor 25. The optical sensor 25 of the device 10 may be electrically coupled with an optical sensor controller. The optical sensor 25 may comprise charge-coupled device (CCD) or complementary metal-oxide semiconductor (CMOS) phototransistors. The optical sensor 25 receives light from the environment, projected through one or more lens, and converts the light to data representing an image. In conjunction with an imaging module (also called a camera module), the optical sensor 25 may capture visual media (i.e. still images or video). In some embodiments, the optical sensor 25 may be located on the front of the device 10, opposite the touch screen display 70 on the back of the device 10, so that the touch screen display 70 may be used as a viewfinder for either still and/or video image acquisition. In some embodiments, the optical sensor 25 may be located on the back of the device 10 to capture image(s) of the user. In some embodiments, one optical sensor 25 may be located on the back of the device 10 and another optical sensor 25 may be located on the front of the device 10. In some embodiments, the position of the optical sensor 25 may be changed by the user (e.g., by rotating the lens and the sensor in the device housing) so that a single optical sensor 25 may be used along with the touch screen display to capture still and/or video image.

According to some embodiments presently disclosed, the device 10 comprises an optical sensor 30. The optical sensor 30 of the device 10 may be electrically coupled with an optical sensor controller. The optical sensor 30 may comprise charge-coupled device (CCD) or complementary metal-oxide semiconductor (CMOS) phototransistors. The optical sensor 30 receives light from the environment, projected through one or more lens, and converts the light to data representing an image. In conjunction with an imaging module (also called a camera module), the optical sensor 30 may capture visual media (i.e. still images or video). In some embodiments, the optical sensor 30 may be located on the front of the device 10, opposite the touch screen display 70 on the back of the device 10, so that the touch screen display 70 may be used as a viewfinder for either still and/or video image acquisition. In some embodiments, the optical sensor 30 may be located on the back of the device 10 to capture image(s) of the user. In some embodiments, one optical sensor 30 may be located on the back of the device 10 and another optical sensor 30 may be located on the front of the device 10. In some embodiments, the position of the optical sensor 30 may be changed by the user (e.g., by rotating the lens and the sensor in the device housing) so that a single optical sensor 30 may be used along with the touch screen display to capture still and/or video image.

According to some embodiments presently disclosed, the optical sensor 25 may comprise fluorescence imaging camera, 3D stereoscopic imaging camera, thermal imaging camera, or speckle imaging camera. According to some embodiments presently disclosed, the optical sensor 30 may comprise fluorescence imaging camera, 3D stereoscopic imaging camera, thermal imaging camera, or speckle imaging camera. According to some embodiments presently disclosed, the device 10 may comprise fluorescence imaging camera, 3D stereoscopic imaging camera 501, thermal imaging camera 502, and/or speckle imaging camera.

According to some embodiments presently disclosed, the optical sensor 25 may comprise triple band pass filter (440 nm and 550 nm, and 700 nm). The triple band pass filters are configured to cut off the NADH excitation wavelength to the optical sensor 25. According to some embodiments presently disclosed, the optical sensor 30 may comprise double band pass filter (520 nm and 700 nm). The double band pass filters are configured to cut off the NADH/FAD excitation wavelength to the optical sensor 30.

According to some embodiments presently disclosed, the optical sensor 25 is a color optical sensor. According to some embodiments presently disclosed, the optical sensor 25, when imaging under ambient light, may act as a view finder for operators to position the system correctly prior to biomarker measurements and for conventional wound dimension measurements.

According to some embodiments presently disclosed, the device 10 comprises a range finder to calibrate the field of view at each image capture distance for comparing wound dimensions across different images and over time.

According to some embodiments presently disclosed, the device 10 may also comprise one or more accelerometers 168 as shown in FIG. 3. The accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated herein by reference in their entirety. Information may be displayed on the touch screen display 70 in a portrait view or a landscape view based on an analysis of data received from the one or more accelerometers 168.

According to some embodiments, the memory 74 may be configured to store one or more software components as described below.

The memory 74 may be configured to store an operating system. The operating system (e.g., Darwin, RTXC, LINUX, UNIX, OS X, WINDOWS, or an embedded operating system such as VxWorks) comprises various software components and/or drivers for controlling and managing general system tasks (e.g., memory management, storage device control, power management, etc.) and facilitates communication between various hardware and software components.

The memory 74 may be configured to store a system software. The system software may provide data storage for measurements and other information that are transferred from the device 10. The system software may provide system management functions for managing the creation of jobs and task lists that can be implemented using the device 10. The system software may be configured to manage data storage and creation of jobs and task lists for one or more devices 10 for an organization. The system software may comprise firmware software, analysis software, and user interface software.

The memory 74 may also be configured to store a communication module. The communication module facilitates communication with other devices over one or more external ports and also includes various software components for handling data received by the RF circuitry 108 and/or the external port. In one embodiment, the external port (e.g., Universal Serial Bus (USB), FIREWIRE, etc.) is configured for coupling directly to other devices or indirectly over a network (e.g., the Internet, wireless LAN, etc.).

The memory 74 may be configured to store a contact/motion module. The contact/motion module is configured to detect contact with the touch screen 70 (in conjunction with the display controller) and other touch sensitive devices (e.g., a touchpad or physical click wheel). The contact/motion module includes various software components for performing various operations related to detection of contact, such as determining if contact has occurred, determining if there is movement of the contact and tracking the movement across the touch screen 74, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module and the display controller may also detect contact on a touchpad. The contact/motion module and the controller may further detect contact on a click wheel.

The memory 74 may be configured to store a graphics module. The graphics module comprises various known software components for rendering and displaying graphics on the touch screen 70, including components for changing the intensity of graphics that are displayed. As used herein, the term "graphics" includes any object that can be displayed to a user, including without limitation text, web pages, icons (such as user-interface objects including soft keys), digital images, videos, animations and the like.

The memory 74 may also be configured to store a text input module. The text input module, which may be a component of graphics module, provides soft keyboards for entering text in various applications that need text input.

The memory 74 may be configured to store a GPS module. The GPS module determines the location of the device and provides this information for use in various applications (e.g., to camera module as picture/video metadata).

The memory 74 may be configured to store applications. The applications may comprise one or more of the following modules (or sets of instructions), or a subset or superset thereof: a camera module for still and/or video images; an image management module; a video player module; and/or online video module.

The applications may comprise additional modules (or sets of instructions). For example, other applications that may be stored in memory 74 may include one or more of the following: a contacts module (sometimes called an address book or contact list); a telephone module; a video conferencing module; an e-mail client module; an instant messaging (IM) module; a browser module; a calendar module; search module; notes module; map module; word processing applications; JAVA-enabled applications; encryption; digital rights management; voice recognition; and/or voice replication.

The camera module (in conjunction with, for example, touch screen 70, display controller, optical sensor(s) 25 and/or 30, optical sensor controller, contact module, graphics module, and image management module) may be configured to capture still images or video (including a video stream) and store them into memory 74, modify characteristics of a still image or video, or delete a still image or video from memory 74.

The image management module (in conjunction with, for example, touch screen 70, display controller, contact module, graphics module, text input module, and camera module) may be configured to arrange, modify or otherwise manipulate, label, delete, present (e.g., in a digital slide show or album), and store still and/or video images.

The video player module (in conjunction with, for example, touch screen 70, display controller, contact module, graphics module, audio circuitry 110, and speaker 111) may be configured to display, present or otherwise play back videos (e.g., on the touch screen 70 or on an external, connected display via external port).

The online video module (in conjunction with, for example, touch screen 70, display system controller, contact module, graphics module, audio circuitry 110, speaker 111, RF circuitry 108,) may be configured to allow the user to access, browse, receive (e.g., by streaming and/or download), play back (e.g., on the touch screen 70 or on an external, connected display via external port), upload and/or otherwise manage online videos in one or more file formats.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module may be combined with another module into a single module. The memory 74 may store a subset of the modules and data structures identified above. Furthermore, memory 74 may store additional modules and data structures not described above.

The device 10 may be configured so as to allow operation of a predefined set of functions on the device be performed exclusively through a touch screen 70 and/or a touchpad. By using a touch screen and/or a touchpad as the primary input/control device for operation of the device 10, the number of physical input/control devices (such as push buttons, dials, and the like) on the device 10 may be reduced.

The predefined set of functions that may be performed exclusively through a touch screen and/or a touchpad may include navigation between user interfaces. In some embodiments, the touchpad, when touched by the user, navigates the device 10 to a main, home, or root menu from any user interface that may be displayed on the device 10.

The device 10 as shown in FIG. 3 may comprise more or fewer components than shown, may combine two or more components, or a may have a different configuration or arrangement of the components. The various components shown in FIG. 3 may be implemented in hardware, software or a combination of both hardware and software, including one or more signal processing and/or application specific integrated circuits.

Components shown in FIG. 3 may communicate over one or more communication buses or signal lines 103.

According to some embodiments presently disclosed, the device 10 comprises a motion sensor 35, orientation sensor 40, temperature sensor 45, distance sensor 50, and/or a plurality of light sources 55. According to some embodiments presently disclosed, the device 10 may also comprise hand controls 80 and/or an illumination driver 85.

According to some embodiments, the illumination driver 85 controls and provides suitable power to the light sources 55. The light sources 55 may be activated by the illumination driver 85 in response to one or more signals from the system processor module 65. According to some embodiments, the light sources 55 are operated in synchronization with the optical sensor(s) (i.e. cameras) 25 and/or 30 to acquire fluorescence image data under appropriate excitation wavelength illumination for each camera 25 and/or 30. The light sources 55 can be operated in continuous or pulsed illumination modes. The pulse mode facilitates background image capture to enhance detectability in brighter ambient light. The illumination driver 85 receives one or more signals from the system processor module 65 to turn the light sources 55 on and off. During fluorescence imaging modes the light sources 55 are turned on and off sequentially via one or more signals from the system processor module 65.

According to some embodiments, the light sources 55, 60 may be lasers, light emitting diodes (LEDs), lamps, or other sources of illumination capable of providing the appropriate wavelengths for fluorescence excitation. According to some embodiments, the light source 55 are high power LEDs in the wavelength range of UV and blue/violet. According to some embodiments, the light source 55 provide illumination time for fluorescence imaging of between 1 msec to 200 msec for each excitation wavelength. The actual time of the exposure for either fluorescence imaging may be controlled by a system software algorithm which takes into account the task being performed, distance to the surface, illumination light energy, required energy for excitation, required energy for disinfection, and other factors to calculate the illumination and imaging times.

According to some embodiments presently disclosed, the plurality of light source 55 may provide illumination. According to some embodiments, the plurality of light sources 55 output spectra overlay the NADH and FAD excitation maxima (440 nm and 535 nm). According to some embodiments presently disclosed, the plurality of light sources 55 excite porphyrin fluorescence from bacterial load in the wound to allow measurement of the presence and extent of infection. According to some embodiments, the plurality of light sources 55 provide 725 nm and 797 nm illumination wavelength for oxygenation analysis.

When the task being performed is fluorescence imaging the system sets the illumination time based on the amount of energy the illumination system provides under UV illumination and under blue violet illumination at a known distance that was determined by measurement during a system calibration process. The system software determines the amount of illumination required for detection of a desired contaminant, such as saliva or biological residues or bacteria, from prior knowledge extracted from experimental measurements with known samples.

According to some embodiments, the camera 25 is configured (i.e. optimized) for collection of fluorescence image data that can indicate the presence of specific contaminants on the biological tissue being examined. According to some embodiments, the camera 30 is configured (i.e. optimized) for collection of fluorescence images from organic residues and other contaminants on the surface being examined.

According to some embodiments, the camera 25 and/or 30 are equipped with lenses optimized to pass the desired wavelengths and placed so that the fields of view of each camera 25 and/or 30 overlap such that the respective images can be subsequently processed to provide registered image data with a common field of view. According to some embodiments, at least one camera 25 or 30 is used in "view finder mode" to guide the operator when aiming the cameras 25, 30 toward targeted surfaces during inspection and disinfection. In "view finder mode", the cameras 25 or 30 is imaging under ambient light illumination or other light sources integrated in the device 10.

According to some embodiments, the system processor module 65 comprises a computer on an integrated circuit with a Central Processing Unit (CPU) with machine learning model computation, multiple data input and output ports, and peripheral device interfaces with connection to various other components as shown in FIG. 3. The system processor module 65 may host the system software that guides inspections, analyzes data, and communicates with the user (i.e. operator) of the device 10 and one or more external servers 90, 95. The system processor module 65 may provide control of the cameras 25, 30 and the light sources 55 for imaging. The system processor module 65 may manage the timing and synchronization of the light sources 55 with the capture of the fluorescence images by the cameras 25, 30. The system processor module 65 may process the captured images to provide meaningful information to operators and for inspection records.

The system processor module 65 may be configured to communicate with and analyze information from at least one of, the distance sensor 50, the motion sensor 35, the orientation sensor 40 and the image sensor 28, 31 to determine whether conditions are unsafe to activate the light source 55. The system processor module 65 may determine the appropriate exposure time for disinfection illumination, to ensure disinfection for a particular target species at a particular distance to the surface to be disinfected, or to control and monitor the disinfection process to determine if during disinfection there was sufficient lack of motion of the handheld device to ensure complete disinfection.

The system processor module 65 may be configured to communicate with and analyze information from at least one of the distance sensor 50, the motion sensor 35, the orientation sensor 40 and the image sensor 28, 31 to determine whether conditions are suitable for image capture such that the image is not blurred, and that sequentially captured images are of the same location on the surface.

According to some embodiments, the distance sensor 50 comprises at least one Light Detection and Ranging (LIDAR) sensor mounted in a forward-facing direction of the device 10 (shown in FIG. 1) and directed towards the field of view of the surface being examined. According to some embodiments, the angular acceptance of the LIDAR sensor can be adjusted programmatically to overlap a desired field of view of the camera systems. According to some embodiments, multiple LIDAR sensors can be used to overlap different portions of the fields of view of the cameras 25, 30. This may be useful if a surface of patient's skin is irregular or of narrow width. According to some embodiments, sensor 50 measures the depth and topology of the biological tissue.

The system processor module 65 may be configured to receive and interpret signals from the hand actuated controls 80 of the device 10. Hand actuated controls 80 can include momentary push button switches, on/off push button switches, or multi-axis push button controls that can be used to guide a cursor on the display 70.

According to some embodiments, the device server 90 comprises a computer system connected either wirelessly or by a secure wire or fiberoptic connection to the device 10. According to some embodiments, the device server 90 is a cloud server. The device server 90 may be configured to host the image and inspection history databases for one or more devices 10 and communicates with the system software on one or more devices 10. According to some embodiments, the device server 90 manages the communication of data and reports to and from one or more external servers 95.

According to some embodiments, the one or more external servers 95 may be customer servers or servers providing other data such as local environmental conditions or local disease prevalence. The device server 90 may also host web portals where users of the device 10 and or their managers can view inspection histories, incident reports, device status, inspection status, and where users can setup inspection task lists and perform other management and reporting functions regarding cleanliness status and completeness of the tasks for an inspection task list, multiple inspection task lists for multiple handheld devices or operators, of a facility, or of multiple facilities.

According to some embodiments presently disclosed, the device 10 comprises ventilation ports 59 directing cooling airflow exhausts from fan driven cooling system 107.

According to some embodiments presently disclosed, the system software is fully or partially stored in memory of the device server 90. According to some embodiments presently disclosed, the system software runs on the device server 90.

According to some embodiments presently disclosed, the system software may provide data storage for measurements and other information that are transferred from the device 10. The system software on the device server 90 may provide system management functions for managing the creation of jobs and task lists that can be implemented using the device 10. The system software on the device server 90 may be configured to manage data storage and creation of jobs and task lists for one or more devices 10 for an organization. For example, a company may have five devices 10 at different locations that are managed from a single device server 90. According to some embodiments, the device server 90 may also manage data storage and creation of jobs and task lists for multiple organizations with multiple devices 10.

According to some embodiments presently disclosed, the device server 90 is a cloud server wirelessly connected to one or more devices 10 and providing services to many organizations. The cloud device server 90 may comprise web portals that are accessible through the internet where users or managers can manage one or more devices 10. The system management software on the device server 90 may provide for the creation, storage, and retrieval of inspection and sanitation reports. The system management software on the device server 90 may provide for the creation of a risk index for each inspection task and for analysis of previous inspection and sanitation reports to analyze ongoing risk and apply an updated risk index for each inspection task. The system management software on the device server 90 may provide the ability to communicate with external sources of data. External sources of data can be at least one of an organization server, an institutional server, a server providing data from a government or regulatory body, a server providing data from a public or private source of environmental, health, epidemiological, weather, population, scheduling, transportation, etc. information. The management software on the device server 90 may also provide data to local, regional, national, or international agencies or regulatory bodies.

The device server 90 may communicate task management information and collect data via wired or wireless methods to the system software on the device 10. The system software can communicate reports and measurement data and device 10 system status to the device server 90. The system software may comprise firmware software, analysis software, and user interface software.

The user interface software provides information and control screens on the display 70 to guide a medical professional and/or technician (i.e. user and/or operator) through diagnosis of the biological tissue and diagnosis task list. According to some embodiments, the user interface software displays options to the operator via the display 70 and accepts input from the operator via either the display 70 or the hand controls 80 on the smart display and/or accepts input from the operator via the smart display 70 and the hand controls 80 on the device. According to some embodiments, the user interface software provides for communication of inspection tasks, inspection status and inspection results to the device server 90.

The firmware software may be directly connected to and controls the hardware components of the device 10. The user interface software provides information to and interprets commands from the device 10 operator. The analysis software continuously analyzes sensor measurements 35, 40, 50, 45, analyzes image data, and provides information to the operator to guide the diagnosis of the biological tissue.

The firmware software prepares the optical sensors 25, 30 and the light sources 55 for image capture by setting appropriate parameters for each optical sensor including exposure time, camera gain, camera offset, pixel binning, and other programmable settings of the camera appropriate for capturing the desired image. The firmware software also sets the on-times and off-times for each source of illumination.

According to some embodiments, presently disclosed system and method comprises an analytical multimode optical system that provides at least two methods, including but not limited to fluorescence imaging/spectroscopic, reflectance imaging/spectroscopic, scattering imaging/spectroscopic, and/or Raman imaging/spectroscopic analysis of a sample using at least one transmission source, such as a light source, and potentially a sensor or collection element.

According to some embodiments, presently disclosed system and method provides an incident light beam, for example, traveling to a patient's skin via a wide field, or point illumination at the same region or periphery of the collection optics. The presently disclosed system then collects the emitted light from the patient's skin and forwards the emitted light to a photodetector and/or camera for analysis and viewing. The patient's skin can also be illuminated with a laser to generate Raman emissions, fluorescence emissions, or a scattering pattern (e.g. speckle), which are then collected through the same or different optical path and provided to a spectrograph or sensor for wavelength identification. According to some embodiments, presently disclosed system and method employs multiple modes of inspection, and the mode or modes employed may depend on the type of biological tissue being inspected. According to some embodiments, presently disclosed system and method employs feedback to cross-validate or verify different modes of operation and may in some instances be used to adjust inspection parameters.

According to some embodiments, presently disclosed system includes an inspection tool and an associated method of inspection. For example, the presently disclosed system may take the form of a hand-held device or possibly small tabletop device, that incorporates multiple transmission and/ or sensing devices, such as light emitting and sensing devices, multiple corresponding spectral detection systems, and communication and analysis devices and methods. According to some embodiments, presently disclosed device enhances the ability of a medical professional and/or technician to analyze at least a portion of patient's skin and communicate its compositional, molecular, and/or chemical constituents.

According to some embodiments, presently disclosed system and method uses multimode optical imaging to greatly reduce the time required for evaluation of patient's skin and identifying the one or more aspects of the biological tissue. The multiple modes may include but are not limited to the various modes presented and discussed below.

According to some embodiments, presently disclosed system and method uses Hyperspectral Imaging (HSI) functions by integrating conventional imaging and spectroscopy to gain spatial and spectral information from patient's skin and/or subdermal tissue. HSI is capable of capturing reflectance, transmittance, and fluorescence images in the visible and infrared regions with sub-millimeter spatial resolution and high spectral resolution (10 nm). Advantages HSI provides in comparison to other techniques (such as RGB imaging, NIR spectroscopy, and multi-color imaging) include the ability to produce spatial and spectral information, multi-constituent information, and sensitivity to minor components. HSI in the near infrared (NIR) can provide chemical composition present in the biological tissue, such as prediction of fat, protein, and water content. Moreover, HSI enables the detection of certain bacteria that might be present in the biological tissue, such as, for example *E. coli*. Fungal growth in the biological tissue is of particular concern due to the potential for detrimental effects on patient's health. HSI may also be used to identify fungal species such as *Aspergillus flavus, Aspergillus parasiticus, Aspergillus niger* and *Fusarium* spp.

Another source of contamination of the biological tissue is fecal contamination. Multispectral detection of fecal contamination using HSI imaging has been demonstrated A HSI system with a range of 450 to 851 nm may be used to examine reflectance images for the presence of fecal contamination. Fecal contamination sites may be evaluated using principal component analysis (PCA) with the goal of identifying two to four wavelengths that can be used in an online multispectral imaging system. According to some embodiments, fecal contamination can be identified using either of three wavelengths in the green, red, and NIR regions.

One of the main advantages that HSI has over conventional spectroscopy methods is its ability to provide visual distribution maps of contamination in a pixel-wise manner Multiplication of regression coefficients of a multiple linear regression model by the spectrum of each pixel in the image provides a prediction map showing the distribution of bacteria within the biological tissue. Distribution maps of samples examined using HSI may be found in Cheng, J. H., and Sun, D. W., "Rapid quantification analysis and visualization of *Escherichia coli* loads in grass carp fish flesh by hyperspectral imaging method," *Food and Bioprocess Technology,* 8(5), 951-959 (2015), the entirety of which is incorporated herein by reference. In the Cheng and Sun reference, different bacterial loads are graphically represented by colors from blue, (representing low or no bacteria growth) to red (representing high bacteria growth).

HSI is a non-destructive tool for direct, quantitative determination of Enterobacteriaceae loads in the biological tissue. Such a process employs partial least squares regression (PLSR) models and root mean squared errors. Such use of HSI entails a simplified PLSR model that predicts Enterobacteriaceae loads in every pixel of the image acquired from HSI, resulting in a new image called a 'prediction map' The prediction map uses a color scale to represent describe the different microbial loads in each spot of the sample.

Feng, Y. Z., ElMasry, G., Sun, D. W., Scannell, A. G., Walsh, D., and Morcy, N, "Near-infrared hyperspectral imaging and partial least squares regression for rapid and reagentless determination of Enterobacteriaceae on chicken fillets," *Food Chemistry,* 138(2), 1829-1836 (2013), the entirety of which is incorporated herein by reference, shows an image of a median-filled prediction map using a simplified PLSR model built on wavelengths of 930, 1121, and 1345 nm. The values under each sample represent predicted Enterobacteriaceae counts in $\log_{10}$ CFU $g^{-1}$. As shown in the Feng et al representations, when the microbial loads increase, the images shift from a blue color to a more reddish one, reflecting the growth of bacteria.

According to some embodiments, presently disclosed system and method uses Raman Spectroscopy and Spectral Imaging. Raman spectroscopy is a non-destructive spectroscopic technique, based on the vibrational properties of the constituent molecules, that provides molecular information about the sample under examination. The Raman signal results from molecules excited by a small amount of incident light at a specific wavelength. The remitted light has some photons shifted to different wavelengths by the addition or subtraction of vibrational energy from some of the tissue intra-molecular bonds. Contrast is achieved when the tissue molecular constituents differ such that the Raman signals from two tissues have different wavelength distributions. Raman Spectral Imaging (RSI) intertwines Raman spectroscopy and digital imaging to visualize the composition and structure of a target, which is useful in the biological tissue analysis. Although its signal-to-noise is low, Raman imaging is a highly specific and sensitive technique that allows for the detection of particular chemicals at low concentrations. One study aimed at the detection and differentiation of waterborne bacteria (*E. coli. Staphylococcus epidermidis. Listeria monocytogenes*, and *Enterococcus faecalis*) used surface-enhanced Raman spectroscopy (SERS) coupled with intracellular nanosilver as SERS substrates. Variations observed in the spectral patterns of bacterial pathogens resulted from different quantity and distribution of cellular components such as proteins, phospholipids, nucleic acids, and carbohydrates. SERS coupled with statistical analysis is useful in discriminating and detecting bacterial cells, spores, and viruses.

According to some embodiments, presently disclosed system and method uses Raman sensor system with an integrated 671 nm microsystem diode laser as excitation light source for the rapid in situ detection of bacteria. The system used in this situation demonstrates a reduction in form factor enabled by recent advances, where such a system includes three main components: a handheld measurement head with a laser driver electronics board, the Raman optical bench, and a battery pack. Such a system has been employed to rapidly detect, for example, musculus longissimus dorsi (LD) and musculus semimembranosus (SM). The total number of mesophilic aerobic microorganisms exhibit possible correlations of bacterial growth with the measured Raman spectra.

According to some embodiments, presently disclosed system and method uses Speckle (scattering) Imaging. Undesirable microorganisms include bacteria, yeast, and mold. Laser Speckle imaging is presently used to monitor moving particles in optically inhomogeneous media by analyzing time-varying laser speckle patterns in detecting contaminants. Light paths associated with the movements of living microorganisms result in time-varying changes in speckle intensity patterns. By detecting the decorrelation in the laser speckle intensity patterns from tissues, the living activities of microorganisms can be detected Bacterial colonies can be detected within a few seconds using Speckle imaging. Presently disclosed system and method provides an efficient and effective way to detect live bacteria in the biological tissue. Speckle imaging systems sense the presence of bacterial colonies and other contaminants in the biological tissue.

Laser Speckle Contrast Imaging (LSCI) is a non-scanning optical technique used in observing, for example, blood flow in medical applications or live bacteria colonies. Speckles are produced when coherent light scattered back from biological tissue is diffracted through the limiting aperture of focusing optics. Mobile scatterers, i.e. scattering objects or items that are moving, cause the speckle pattern to blur. According to some embodiments, the presently disclosed system design employs a model that inversely relates the degree of blur, called "speckle contrast," to the scatterer speed. In tissue, red blood cells are the main source of moving scatterers. Bacteria movement acts as a virtual contrast agent.

One label-free bacterial colony phenotyping technology is the BARDOT (Bacterial Rapid Detection using Optical Scattering Technology) system, which can provide classification for several different types of bacteria. A certain speckle formation allows for the detection and identification of these bacterial species. As the center diameter of the *Bacillus* spp. colony grows from 500 to 900 microns, the average speckle area decreases two-fold in certain experiments and the number of small speckles increases seven-fold. As *Bacillus* colonies grow, the average speckle size in the scatter pattern decreases and the number of smaller speckle increases due to the swarming growth characteristics of bacteria within the colony.

According to some embodiments, presently disclosed system and method uses Fluorescence spectroscopy to identify and differentiate bacteria Fluorescence spectroscopy is a simple, non-destructive, non-invasive and relatively inexpensive analytical method. In comparison with other classical analytical methods, fluorescence spectroscopy provides enhanced selectivity, high sensitivity to a wide array of potential analytes, and has no requirement for consumable reagents or extensive sample pre-treatment. This technique is based on the intrinsic fluorescence of bacterial cell components. When examined with ultraviolet light, aromatic amino acid residues (tryptophan, tyrosine, phenylalanine), nucleic acids, and co-enzymes are intrinsic fluorophores. However, due to the multicomponent nature of items such as foods, their fluorescence spectra are complex and chemometric methods using multivariate analysis are needed to extract contaminant specific information. Presently disclosed system and method may vary both the excitation and detection wavelengths, and measure both reflectance and fluorescence emission properties of the biological tissue. Presently disclosed system and method is adjusted or may adjust for specific contaminants. For biological tissues, dual or multiple excitation fluorescence can increase the specificity and accuracy of classification and quantification of specific sources of fluorescence. When the system employs dual excitation wavelengths, fluorescence emission contributions of contaminants can be more precisely detected, and the presently disclosed system may disregard other irrelevant or unnecessary fluorescence components of the biological tissue. According to some embodiments, Ratiometric versions of this approach may be employed.

According to some embodiments, presently disclosed system and method uses reflectance and fluorescence hyperspectral imaging. Hyperspectral imaging integrates spectroscopic and imaging techniques to enable direct identification of different components and their spatial distribution in the biological tissue. The resulting three-dimensional dataset or 'hypercube' contains two spatial dimensions and one spectral dimension. The advantages of hyperspectral imaging over traditional methods include no, or minimal, sample preparation, no contact, nondestructive nature, fast acquisition times, and visualization of the spatial distribution of numerous components simultaneously.

According to some embodiments, presently disclosed system and method combines several optical imaging methods, for example a combination of reflectance and fluorescence spectroscopy together with dynamic speckle imaging. Fluorescence spectroscopy is a simple, non-destructive, non-invasive and relatively inexpensive analytical method that provides enhanced selectivity, high sensitivity to a wide array of potential analytes, as well as no requirement for consumable reagents or extensive sample pre-treatment. Fluorescence spectroscopy is based on the intrinsic fluorescence of bacterial cell components. When examined with ultraviolet light, aromatic amino acid residues, nucleic acids, and co-enzymes are intrinsic fluorophores. However, due to the multicomponent nature of the biological tissue, their fluorescence spectra are complex, and chemometric methods using multivariate analysis are employed to extract contaminant specific information By varying both the excitation and detection wavelengths and measuring both reflectance and fluorescence emission properties of the biological tissue, the presently disclosed system can be employed to accurately assess specific contaminants. For biological tissues, dual or multiple excitation fluorescence can increase the specificity and accuracy of classification and quantification of specific sources of fluorescence. According to some embodiments, the presently disclosed system employing dual excitation wavelengths allows for more specific detection of fluorescence emission contributions of contaminants and disregard other fluorescence components.

According to some embodiments, presently disclosed system and method uses Infrared spectroscopy, for example, is a fast, sensitive, and non-destructive technique that may be used to analyze the biological tissue. Analyzing the biological tissue using the mid infrared spectrum (4000-400 $cm^{-1}$) can give valuable information about the existence of molecular bonds. Such details can help determine the types of molecules present in the biological tissue. According to some embodiments, presently disclosed system and method employ Fourier Transform Infrared Spectroscopy (FTIR) combined with attenuated total reflectance (ATR) and partial least square regression (PLSR) to detect the presence of lard/fat in the biological tissue.

The FTIR spectra of both mutton body fat (MBF) and lard is shown in Jaswir, I., Mirghani, M. E. S, Hassan, T. H., and Said, M. Z. M., "Determination of lard in mixture of body fats of mutton and cow by Fourier transform infrared spectroscopy," *Journal of oleo science*, 52(12), 633-638 (2003), the entirety of which is incorporated herein by reference. One representation in Mirghani, et al. shows distinct differences in the raw spectra obtained between MBF and lard. The frequency region 3010-3000 cm$^{-1}$ indicates a significant difference between lard and MBF The lard spectrum has a sharp band at higher frequency (3009 cm$^{-1}$) than MBF which has a shoulder peak at low frequency (3001 cm$^{-1}$). FTIR inspection provides a clear and concise manner to identify lard in a mixture of other fats.

According to some embodiments, presently disclosed system and method uses visible and near infrared reflectance spectroscopy (VIS-NIRS). VIS-NIRS combined with partial least square regression analysis can be used to analyze the biological tissue through analysis of the spectral data collected by reflectance.

According to some embodiments, presently disclosed system and method uses multimode hyperspectral imaging system. Due to the multicomponent nature of biological items such as the biological tissue, their reflectance or fluorescence spectra are complex. Chemometric methods using multivariate analysis may be employed by the present system to extract contaminant specific information. By varying both the excitation and detection wavelengths and measuring both reflectance and fluorescence emission properties of the biological tissue, profiles may be assessed, refined, and employed when examining specific contaminants. For biological tissues, dual or multiple excitation fluorescence can increase the specificity and accuracy of classification and quantification of specific sources of fluorescence. The combination of different spectroscopic methods (such as fluorescence and NIR spectroscopy) circumvents single method inherent limitations and can employ optical sensing for in situ mycotoxin detection. Additional chemometric tools eliminate factors related to disturbing the biological tissue and enable extraction of desired biochemical information with respect to contamination with fungi and/or mycotoxins.

The multimode hyperspectral imaging system may operate in fluorescence and reflectance modes and may concurrently, or at a different time, employ speckle imaging. One example of such a system is presented in FIG. 4. The system uses spectral band sequential imaging on the detection side. To ensure high signal to noise level, camera and spectral selection filter integration time is optimized for each spectral band from visible to the near infrared. The illumination module uses two independent light sources to provide illumination for fluorescence excitation and reflectance measurements using three computer-controlled LED illumination rings. The UVA (375 nm) and blue/violet (420 nm) LED rings provide fluorescence excitation. White LEDs will be used for reflectance illumination. The HSi-440CO Hyperspectral Imaging System (Gooch & Housego, UK, originally developed by ChromoDynamics, Inc.) incorporated in the presently disclosed system can image and analyze multiple signals in fixed and living cells at video rates. Its tunable filter can switch wavelengths within microseconds. The system acquires multi-wavelength, high-spatial and spectral resolution image datasets, and can compute and display quantitative signal-specific images in near real-time. The spectrally controllable image capture system can record spectral images of food samples in wavelengths ranging from 450 nm through 800 nm. The system is configured as a tabletop platform where illumination and detection operate above the biological tissue. In this system, time-varying speckle signals can be quantitatively addressed with speckle correlation time. A sample containing living microorganisms has a correlation time shorter than a static one, and thus contaminated biological tissue is less time-correlated due to the spontaneous motility of microorganisms Correlation time of scattered light from biological tissue, as well as presence and activity of microorganisms are quantitatively analyzed.

Oxidative stress plays a vital role in diabetic wound healing. An imbalance of free radicals and antioxidants in the body results in overproduction of reactive oxygen species which leads to cell and tissue damage, and delayed wound healing. Decreasing reactive oxygen species (ROS) levels by using antioxidative systems may reduce oxidative stress-induced damage and improve healing.

According to some embodiments, presently disclosed system and method measures Oxidative stress that causes cellular injury in diabetes, Tissue vascularization and oxygenation, and provides Temperature mapping. Oxidative metabolism of glucose in mitochondria is the major driver of oxidative stress in diabetes. FAD and NADH are autofluorescent coenzymes of the mitochondrial respiratory chain whose levels increase with high blood glucose and can be monitored using optical techniques. Mitochondrial redox ratio (NADH/FAD) is a measure of mitochondrial dysfunction, central to the pathophysiology of diabetic wounds. Tissue vascularization and oxygenation, is a measure of adequate blood flow which determines the availability of oxygen to wound tissue. Perfusion and delivery of oxygen to tissue are important in wound healing and can be measured by spectral imaging. Temperature mapping provides an understanding of heat distribution when overlaid on a digital 3D model of the wound and neighboring skin tissue. Previous studies using temperature mapping of skin tissue have empirically determined that a difference of 2.2° C. between corresponding limbs of the same individual is a sign of abnormal skin circulation.

Figure 5:
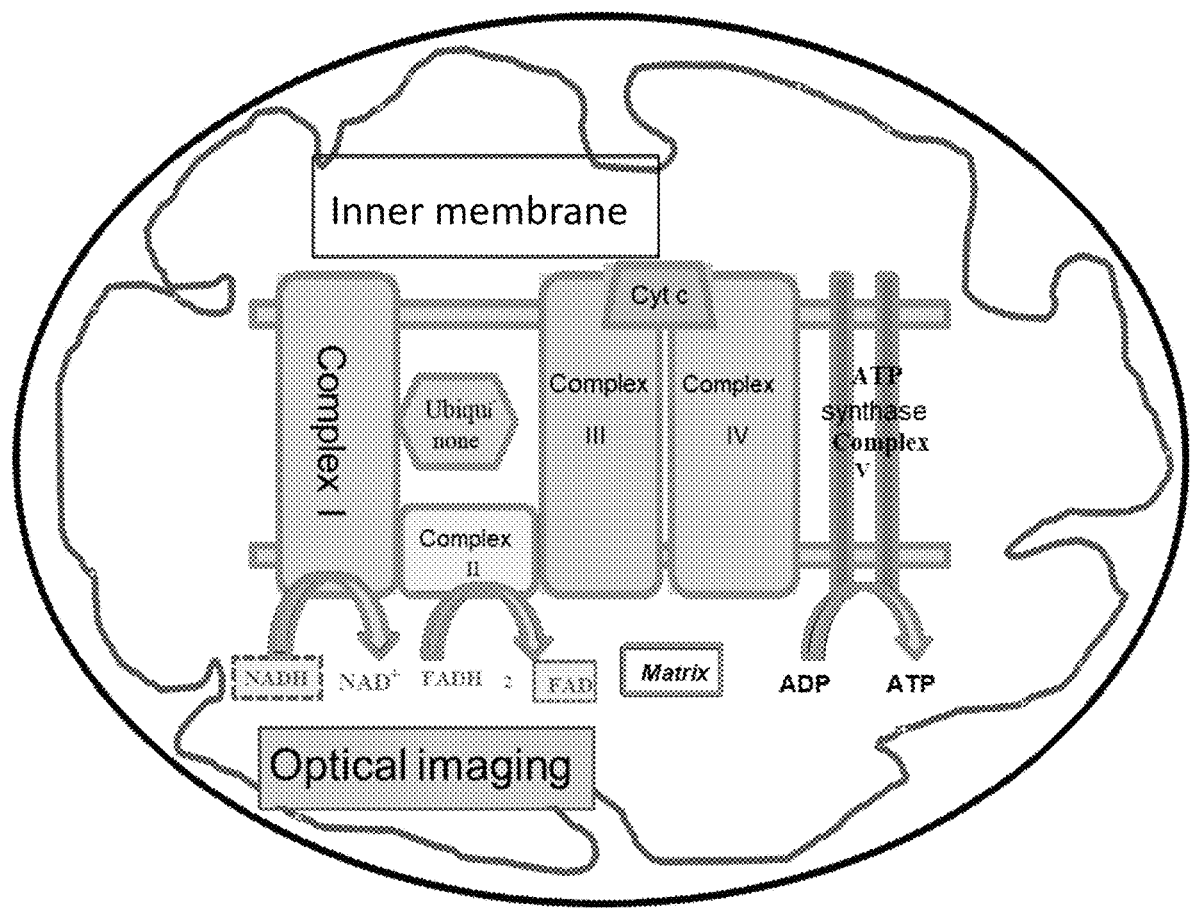
FIG. 5 depicts schematic of electron transport chain.

Presently disclosed system and method provide sensitivity and specificity for discriminating between diseased and non-diseased tissue, while operating non-destructively and in real-time when measuring intact organs and in vivo. Although oxygen is a necessary component for complex organisms that demand high energy, overproduction of ROS may cause DNA damage, cell death, and protein modifications that result in mitochondrial and cellular dysfunction. The fluorescence signals of intrinsic tissue fluorophores NADH and FAD provide indicators of tissue metabolism in tissue injury due to hypoxia, ischemia, and cell death. These fluorophores are autofluorescent and can be captured without the use of any exogenous labels at an excitation/emission (Ex/Em) wavelength pair of 365 nm/460 nm for NADH and 440 nm/520 nm for FAD as shown in FIG. 5. The mitochondrial redox ratio (RR=NADH/FAD) is a quantitative marker of the mitochondrial redox state of intact tissue and in vivo tissue.

Figure 6A:
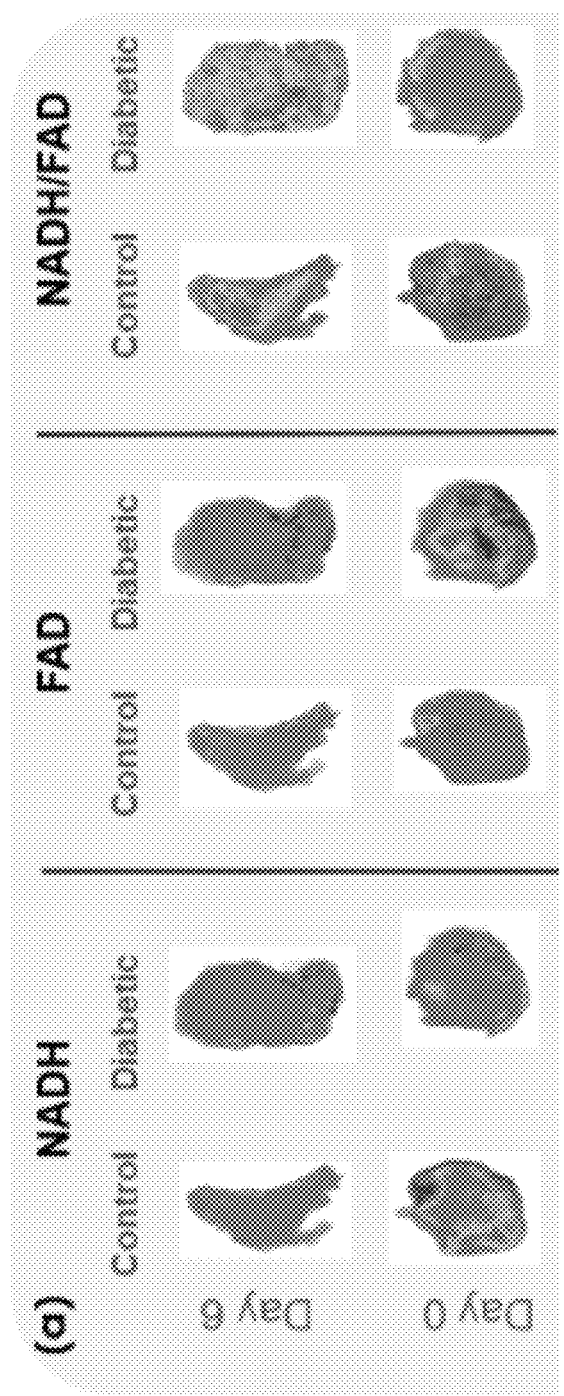
FIG. 6a depicts tissue NADH and FAD fluorescent images.
Figure 6B:
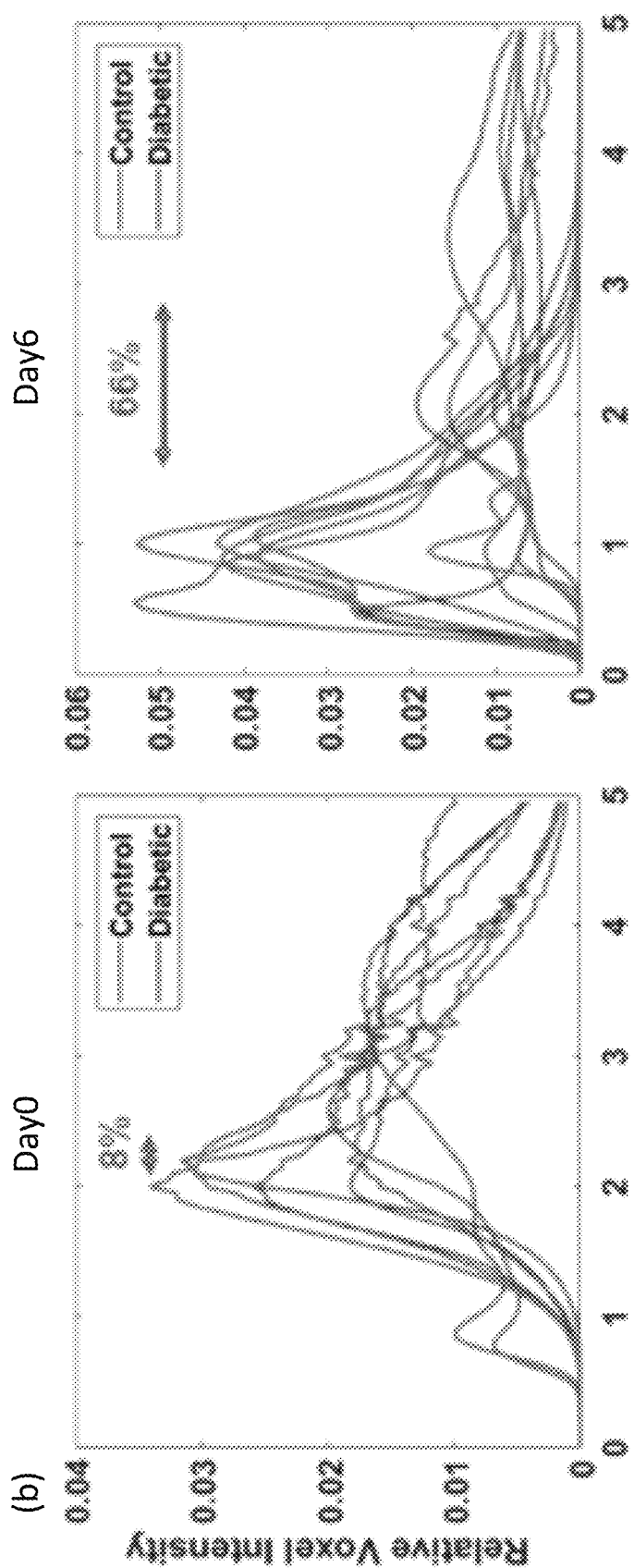
FIG. 6b depicts tissue redox ratio histograms.
Figures 7A, 7B:
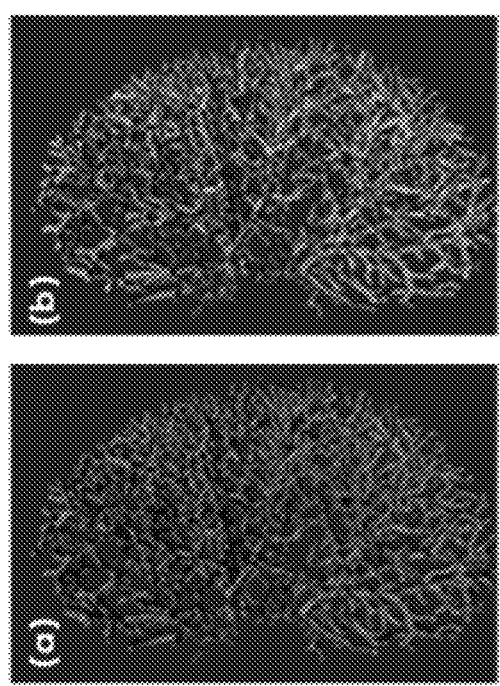
FIG. 7a depicts tissue vasculature extracted from fluorescence imaging.
FIG. 7b depicts color coded vascular diameter of the tissue vasculature.

According to some embodiments, presently disclosed system and method comprise fluorescence imaging system for measuring oxidative stress and mitochondrial redox. Referring to FIG. 6*a*, NADH and FAD images were captured at the surface of the exposed wound in a mouse model to determine the redox ratio. FIG. 7*a-b* show 3D rendered metabolic images (NADH, FAD, and redox ratio) obtained from representative diabetic and control wounds. FIG. 6*b* shows the histogram comparison of the volumetric redox ratio. The fluorescence images of the diabetic mouse shows a 66% lower volumetric redox ratio (oxidized state), lower NADH, and higher FAD fluorescence signals compared to the control. According to some embodiments, NADH and FAD provide prognostic value in assessing wound healing in diabetic wounds.

According to some embodiments, presently disclosed system and method measure variations in tissue oxygenation. According to some embodiments, presently disclosed system and method provide imaging analysis for skin oxygenation that is independent of skin melanin content. Melanin in the epidermis acts like a curtain in she skin, preventing some photons from reaching the dermal layers. When measuring oxygenation, this creates melanin and hemoglobin absorption spectra crosstalk due to the overlapping spectral absorption characteristics of oxyhemoglobin, deoxyhemoglobin, and melanin. High melanin content can be misinterpreted as high deoxyhemoglobin content and produce errors for total hemoglobin and oxygen saturation in people with darker skin or in more pigmented regions of the skin. Inconsistent estimations may also stem from insufficient discrete wavelength measurements. According to some embodiments, broader spectral measurement can significantly improve the accuracy of oxygenation calculation in subjects with deeper skin tone.

According to some embodiments, presently disclosed system and method provides a 3D model of the biological tissue in which the thermal image, from thermal camera, is overlaid on a 3D digital model of wound topology. Monitoring of foot skin temperature to detect whether the temperature difference between contralateral feet exceeds a specified threshold can effectively reduce the incidence of recurrent plantar ulcers.

Figure 8A:
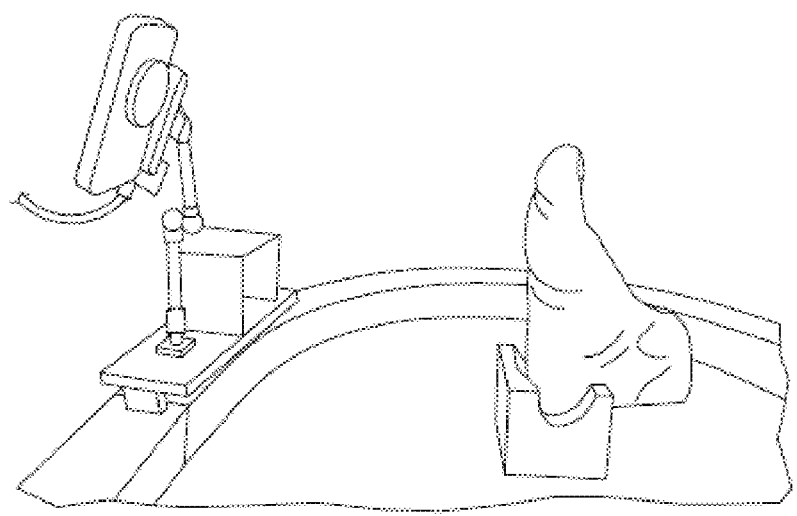
FIG. 8a depicts 3D image scanner of foot.
Figure 8B:
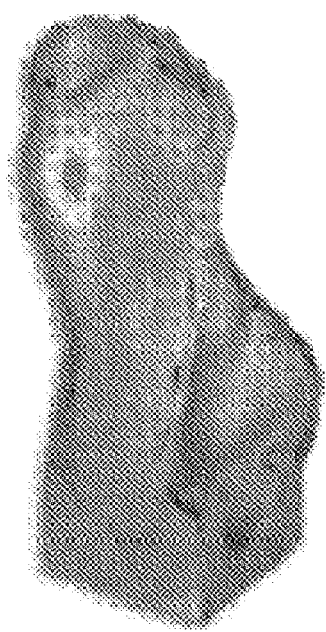
FIG. 8b depicts thermal image of a foot overlay on 3D foot model.

Referring to FIG. 8a, a setup for determining 3D maps of skin tissue with a temperature map overlaid for a foot phantom is shown according to some embodiments presently disclosed. FIG. 8b shows the 3D reconstructed image volume of foot and the thermal image on the ball of a foot phantom. According to some embodiments presently disclosed, a foot scanning unit at the clinic or at home, provides a patient with a molecular, physiological, and visual analysis of the skin and underlying structures of their feet to assess tissue health and improve their quality of life through better disease management. The presently disclosed system can integrate with telehealth systems and electronic health record systems. Clinicians can receive an easy-to-understand report that can help spot problems immediately and track health progress. Accurately mapping hemoglobin distribution can be useful to identify atypical vascular patterns and issues related to melanin depth (i.e. melanoma).

Increased oxidative stress is a major contributor to diabetic complications, including retinopathy, nephropathy, and cardiovascular disease. Oxidative stress also plays a significant role in regulating wound healing and the resulting redox imbalance has major implications in diabetic wounds. Coenzymes NADH and FAD activate mitochondrial metabolism and mitochondrial bioenergetics are altered in dysregulated inflammatory processes observed in the pathophysiology of chronic non-healing wounds. Moreover, optical redox ratio maps produced from wound examinations are associated with a transient increase in keratinocyte proliferation at the wound edge. Cutaneous tissue oxygenation also plays a role in wound healing in diabetic patients. Chronic or prolonged peri-wound and wound bed hypoxia delays healing because tissue metabolic demand increases during recovery from tissue injury while oxygen delivery and availability are reduced. Multimode optical imaging can quantify tissue oxygenation at a microvascular scale and produce a map of microcirculatory changes reflecting oxyhemoglobin and deoxyhemoglobin concentration. Mean oxygenation values in the peri-wound area show significant differences between diabetic ulcers that healed and those that did not. Table 1 identifies, for example, at least five biomarkers that are predictive of wound healing in diabetic foot ulcers.

TABLE 1

Wound biomarkers

| Biomarker | Fluorescence Excitation/ Emission | Reflectance | Diagnostic Marker |
| --- | --- | --- | --- |
| NADH | 365 nm 440 nm | | Metabolic State |
| FAD | 436 nm 520 nm | | |
| Porphyrin | 415 nm 630/ | | Infection |
| Oxygenation | 690 nm | 725 nm | Tissue Oxygenation |
| Oxygenation | | 797 nm | Tissue Oxygenation |
| Vascularture | | 520 nm | Vascularization |
| Temperature | | | Wound temperature |

In clinical practice, evaluation of wound status is based on wound size, odor, drainage, and eschar. These parameters are obtained by direct surface measurement and visual observation. Those gold standards of gross wound evaluation, however, cannot provide functional or structural information from below the wound surface and can be very subjective. According to some embodiments, presently disclosed multimode optical imaging provides quantitative biomarkers of wound state with functional or structural information.

The gold-standard in ulcer assessment is visual inspection plus swabbing for microbiology or biopsy to perform histological analysis. Biopsy is invasive and could potentially introduce a new wound that complicates the wound healing process and the precision of assessment of the wound or ulcer over time. However, presently disclosed optical imaging device 10 provide a quantitative and noninvasive imaging tool that can be used by the clinician (i.e. operator) to assess the wound objectively and provide appropriate treatment.

According to some embodiments, presently disclosed system and method uses a plurality of optical sensors 25, 30, LED illumination and 3D image processing and statistical analysis to produce a high-quality, compact, and low-cost device 10 which can be operated in bright ambient light.

According to some embodiments, presently disclosed system and method extract four parameters—tissue metabolism, oxygenation, bacterial load, and vascular networks—and display these as wound image map overlays. According to some embodiments, presently disclosed system and method provides vasculature, tissue oxygenation, metabolism, and temperature images that cannot be seen with the naked eye According to some embodiments, presently disclosed system and method Artificial Intelligence (AI) and machine learning (ML) to quantitatively measure DFU volume, ischemia, and infection load for wound assessment. According to some embodiments, presently disclosed system and method provides the 3D visualization of the extremity and diabetic wound itself as well as efficient detection of infection location and possible ischemia. According to some embodiments, presently disclosed device 10 captures red-green-blue (RGB) conventional reflectance and two fluorescence images. According to some embodiments, presently disclosed device 10 uses two wavelengths, UVA (365 nm) and violet (405 nm) lights, for excitation to create the fluorescence map or special pattern of tissue and indicate low bacterial burden ($\geq 10^3$ CFU/g) under ambient light. The presently disclosed device 10 contains optical filters which pass wavelengths related to NADH, FAD, pyoverdines, porphyrins, and connective tissue contents. It overlays both fluorescence images on the areas with infection and automatically discriminates bacterial gram-type using ML to ensure accurate treatment decisions. Gram-positive bacteria fluoresce red and gram-negative ones are displayed in green based on differences in fluorescence intensity. Connective tissue and *Pseudomonas aeruginosa* emit green and blue-green (cyan) fluorescence respectively. Some color signals of tissue cannot be discriminated from bacterial infection. By comparing the reflectance and fluorescence wound images, the clinician can overcome misinterpretation of data. Ischemia can be determined using conventional reflectance images. For further bacterial analysis to indicate specific species, swabbing and tissue sampling can be performed by the device's guidance. The real-time data lead to targeted treatment plans, including real-time monitoring of the efficacy of debridement and cleansing, and usage of appropriate antimicrobial dressings by home health nurses. After a comprehensive assessment of DFU using presently disclosed device 10, any severe infectious or ischemic DFU images/documents may be simultaneously synced to the hospitals' database and referred to a podiatrist and vascular specialist for timely revascularization and other interventions. Presently disclosed system may implement the Pandemic Diabetic Foot Triage System to make timely referrals by sharing the elderly wound assessment data with a convenient site for care. It assists DFU re-staging following debridement or revascularization to re-evaluate the treatment plan over time, initially after 4-6 weeks followed by 3-6-month intervals or even longer. Presently disclosed system may monitor wound healing by comparing the patient's new data with the previously recorded document.

According to some embodiments, presently disclosed system and method characterizes materials, typically biological tissue based on multimode spectral analysis. According to presently disclosed system and method, such analysis includes identifying features from different modes of measurement. Feature extraction/selection strategy or methods for different modes of measurement may differ based on measurement physics and biological/chemical characteristics. Examples of feature extraction methods include wavelet transform, starstistical features, haralick textural features, fractal analysis, and curvelet transform. The presently disclosed system and method may employ feature selection methods such as principal component analysis (PCA), independent component analysis (ICA), curvature and/or manifold learning.

Wavelet transform is a mathematical transform to extract information from a signal or an image. In one dimensional wavelet transform, the input signal is represented at different scales called coarse and detail components using a set of basic functions originally from a function called mother function.

The presently disclosed system and method may, online or offline, include identifying which spectral measurement mode (or combination) will have the highest impact resulting among the top combinations. Optimization is based on a cost function (sensitivity, specificity, area under the curve) from a receiver operating characteristics (ROC) curve. Depending on technology complexity, the system employs desired practical modes.

Based on the practical modes determined, the present design links the biology and chemical components of the biological tissue and correlates them with highest differentiating spectral features. Different biological tissues may exhibit differences in this regard. The presently disclosed system may run independent measurements using metabolic and/or chemical analysis of samples to validate the biological/chemical differentiation between samples to determine optimal modalities. The presently disclosed system may use these optimal modalities to conduct a pilot study with sample size greater than or equal to a number of samples, such as 100, sufficient for collection and analysis of enough data from a variety of samples in view of other parameters.

Figure 9:
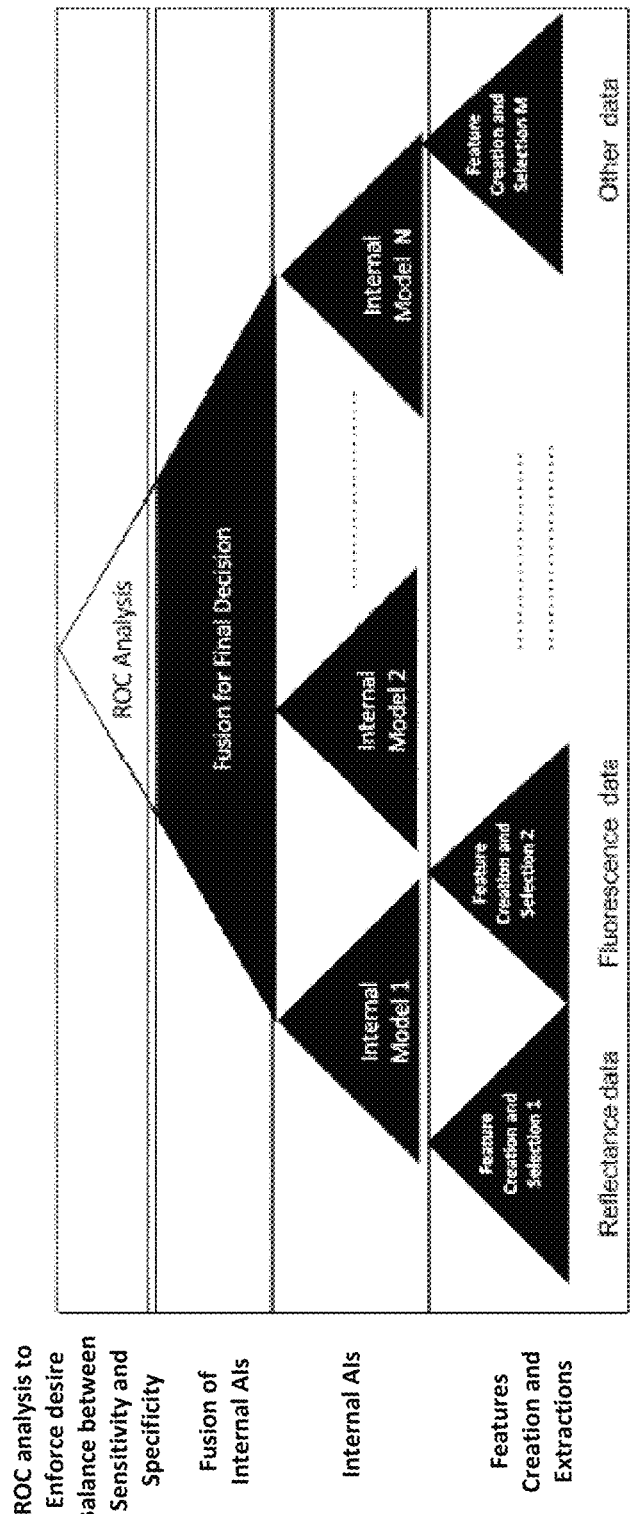
FIG. 9 depicts a conceptual representation of fusion artificial intelligence according to some embodiments presently disclosed.

FIG. 9 illustrates the proposed architecture and high-level steps. Level 1 includes Signal Conditioning, Feature extraction and Feature selection. Level 2 includes all trained models for different applications and classes. Level 3 fuses internal decisions (AI scores) coming from all internal AI models to get a final AI score Level 4 applies a receiver operating characteristic (ROC), representing the diagnostic ability of the Classifiers as the discrimination threshold is varied, to enforce desired balance between specificity and sensitivity of the AI system.

Processing of this type may be divided into two modules, feature extraction and classification. The feature extraction module processes the raw data into a low dimensional feature vector that is relatively invariant to distortions and artifacts and is high in information content, making it suitable to be used by the Classifier stage. Prior knowledge about the data and the experience acquired on building similar systems may be employed. This stage of machine learning (ML) may require experimentation and fine-tuning by hand. The Classifier is usually chosen from the large number of available generic modules and is trained using available data.

The presently disclosed system may employ a numerical computing framework, such as, for example, MATLAB, for model development and validation. The observations (input data) are raw measurements obtained by the system Training set class "labels" may be provided by DNA analysis. In the first stage, internal Classifiers are trained separately. A final classifier is obtained by fusing the prediction of several internal classifiers (models).

Figure 4:
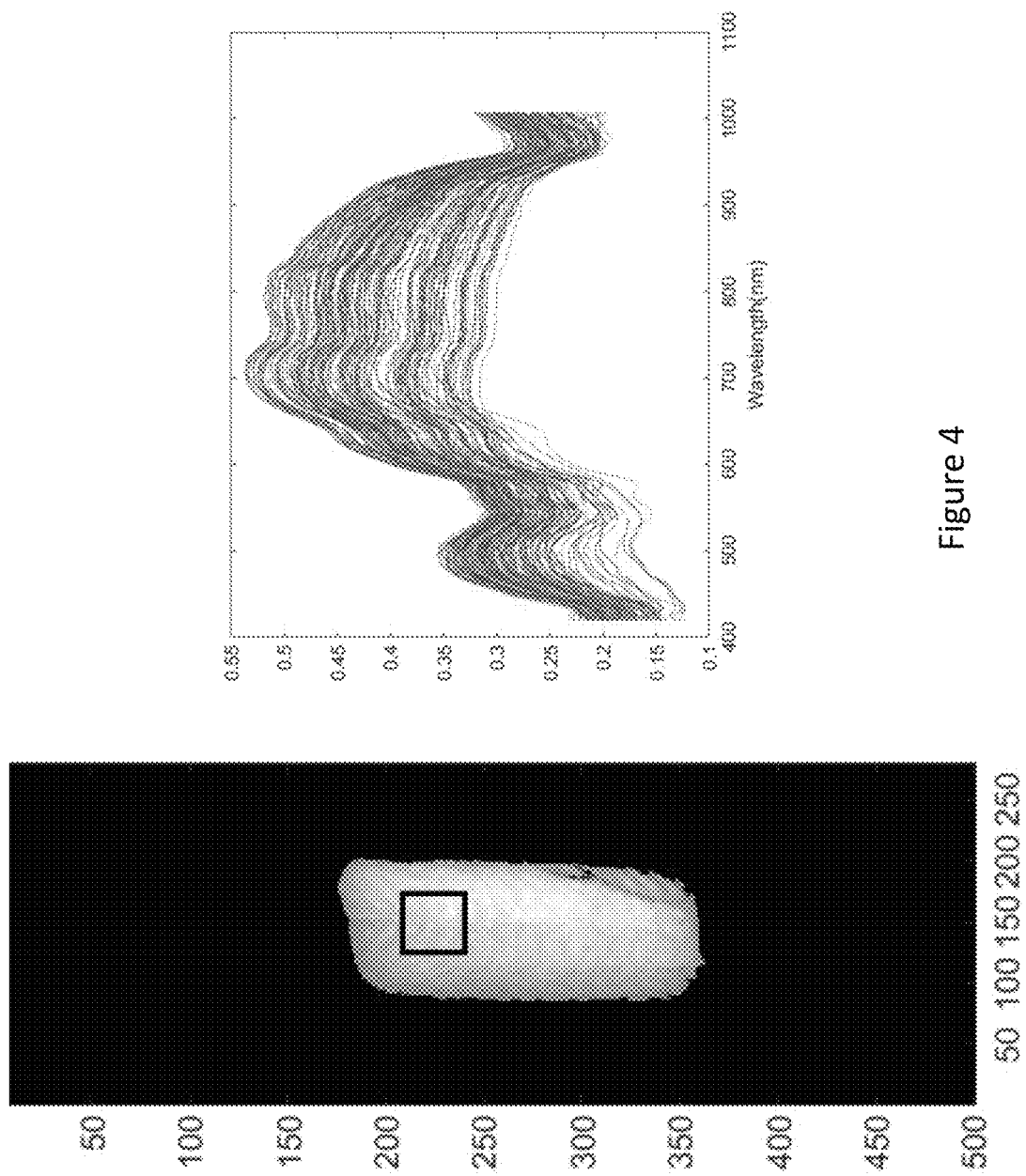
FIG. 4 depicts biological sample and reflectance spectral signatures of the biological sample.
Figure 10:
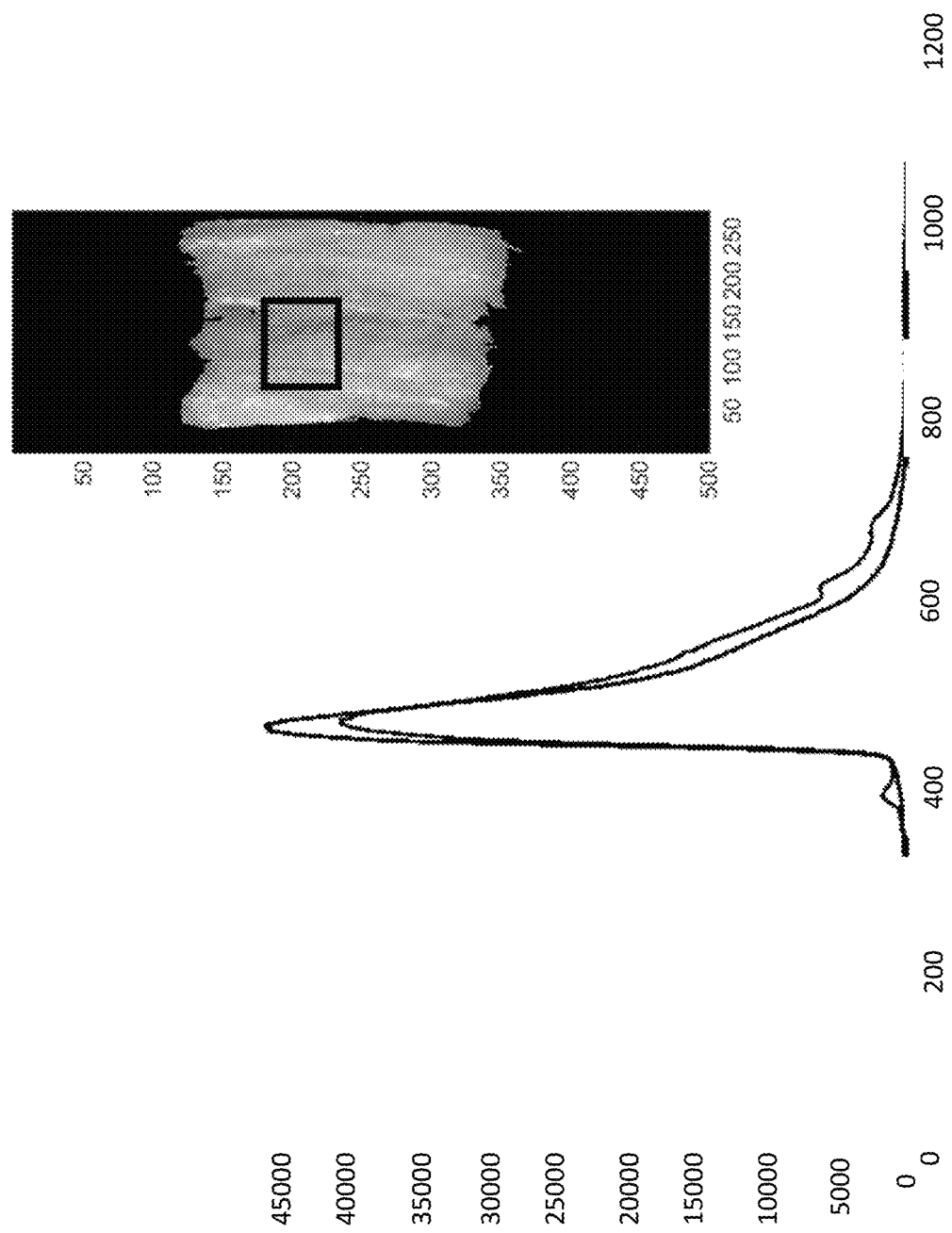
FIG. 10 depicts biological sample and fluorescence spectral signatures of the biological sample excited by two illumination wavelengths.

The presently disclosed system may employ spectral acquisitions (raw signals) where raw data includes fluorescence and reflectance spectral data and correlative biological tissue results. FIG. 4 illustrates reflectance results while FIG. 10 shows fluorescence results, representing typical raw data signals. Biological tissues are imaged on the left, with acquired spectral signatures shown ion the right Data may be collected from any number of cases and used for classification pipeline model selection and validation A holdout set may be employed for Classifier final testing.

The system performs signal conditioning to reduce data variability caused by differences in hardware probes and operating conditions. This includes probe-specific calibration, dark current removal, and wavelength alignment to a unique set of wavelengths via interpolation. In addition, the system uses signal-to-noise, signal validation and saturation tests to reject bad data samples.

Data may be initially calibrated prior to feeding to the classification pipeline, based on individual spectroscopic data acquisition system characteristics. The extraneous parts of the signal may be truncated from the reflectance and fluorescence signals Valid wavelength ranges may be obtained by examining raw data, automatically or manually, or performing an optimization and exhaustive search to find valid wavelength ranges.

The presently disclosed system may perform wavelength alignment using interpolation. Because the spectrometer cannot be calibrated such that the response is measured exactly at the same wavelengths for all units, the system may employ a reference wavelength grid to compare collected signals. The presently disclosed system may obtain the signal aligned to the reference grid from the raw signal using a cubic or linear spline interpolation from values measured by a spectrometer, and these values may be used by the pipeline.

After initial signal conditioning, the system may extract features from the raw data. Processing of conditioned data into a low dimensional feature vector creates features that are relatively invariant to distortions and artifacts and valuable informational content. This combination makes the results of this stage suitable to be used in the Classifier stage.

The presently disclosed system, or those providing functionality for the presently disclosed system, may use prior knowledge about the data during this stage to determine optimal methods of feature extraction. These include original raw data in linear or log space, wavelet transform, statistical features, and textural features. The presently disclosed system may use feature level fusion by combining into a single vector feature vector The presently disclosed system may determine or provide a separate AI model for each feature type and will fuse outcomes of each AI in decision levels as well.

The presently disclosed system may perform feature selection using methods such as Principal components analysis (PCA) and Independent Component Analysis (ICA) algorithms for dimensionality reduction and removing redundant features and information.

PCA is a statistical method that converts a set of observations and sensor data with some level of redundancy and correlation into a set of uncorrelated components called principal components by use of an orthogonal transformation.

Independent component analysis (ICA) decomposes a multivariate signal into statistical independent non-Gaussian components. ICA could be used for feature selection and reduction. We stack our raw data vectors in a matrix where each row is an observation ICA reduces the number of columns or rearranges the information in the raw data into a smaller number of features.

The presently disclosed system may normalize features using methods including but not limited to z-score area under the curve (AUC).

For low level (internal) algorithms, a number of models may be employed: Deep learning techniques including conventional neural network (CNN) and tensor flow, Artificial Neural Networks; Support Vector Machines (SVM) including linear, non-linear; AdaBoost.

All of these machine learning methods are supervised binary classification models. A binary classifier is a numerical pipeline which has as input a numerical vector and outputs a binary decision, assigning the input membership to one of two classes.

A deep learning model continually analyzes data with a logic structure similar to how a human would draw conclusions. To achieve this, deep learning uses a layered structure of algorithms called an artificial neural network (ANN). The design of an ANN is inspired by the biological neural network of the human brain. This makes for machine intelligence that's far more capable than that of standard machine learning models.

Differences between classical machine learning and AI versus deep learning include: machine learning uses algorithms to parse data, learn from that data, and make informed decisions based on what has been learned; deep learning structures algorithms in layers to create an "artificial neural network" that can learn and make intelligent decisions on its own; and deep learning is a subfield of machine learning. While both fall under the broad category of artificial intelligence, deep learning powers the most human-like artificial intelligence.

Figure 11:
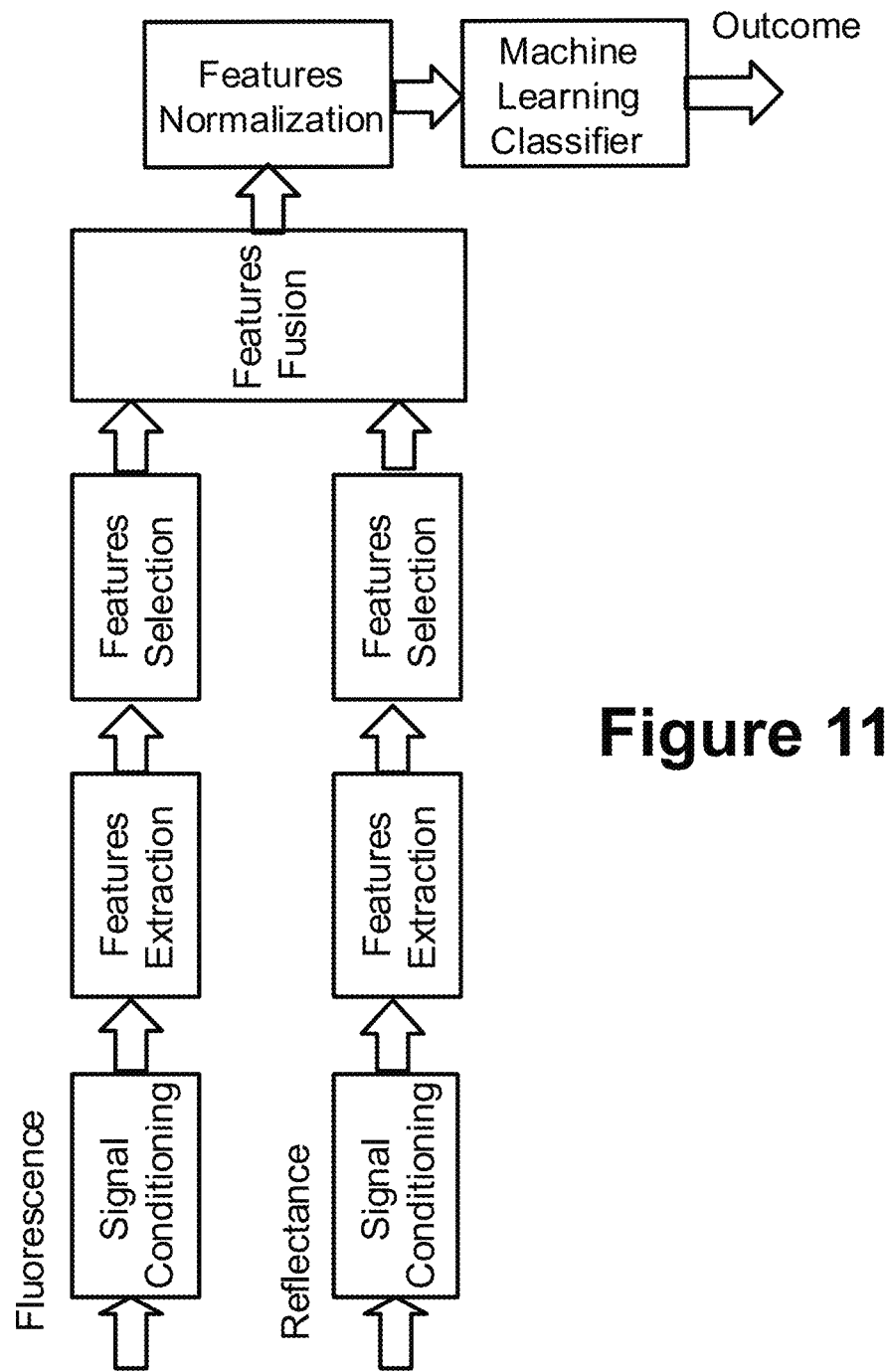
FIG. 11 depicts artificial intelligence model according to some embodiments presently disclosed.

The presently disclosed system may partition the data, with approximately 70% used for training and 30% for testing. The process may be repeated multiple times to test if data is independent and identically distributed and is exchangeable. Such processing can help to evaluate intAI (internal AI) performance by calculating mean and confidence interval for intAI performance. FIG. 11 shows one intAI architecture with feature extraction and selection (Extraction) prior to executing intAI.

The top level in the AI architecture of FIG. 11 is "fusion." At this level, the system fuses internal (low-level) algorithms results (decisions) to obtain a final decision. With selected Classifiers, the system computes a weighted sum of Classifier decisions/score. The system makes a global decision by comparing this sum to a threshold.

From FIG. 11, there is provided a fluorescence path and a reflectance path, where fluorescence passes fluorescence image readings to an input data conditioning element, which in turn passes data to feature extraction and selection modules. Reflectance passes reflectance image readings to signal conditioning modules to align data using interpolation grid and filter invalid data using data quality filters such as SNR (signal-to-noise ratio). If features level fusion of fluorescence and reflectance data is desired, a similar data processing chain could be applied to reflectance data as well. The features coining from fluorescence and reflectance data are fused. After normalization the fused features are fed to a machine learning model.

According to some embodiments, the fusion of fluorescence image readings and reflectance image readings shown in FIG. 11 may be used to: identify tissue type of the biological tissue, provide depth of the wound, provide level of penetration, provide inflammation information, provide would healing biomarkers. An alternate representation of the processing is presented in FIG. 12.

With respect to AI training and internal Models Selection Process, the system may perform an exhaustive search and optimization to find best internal and fusion models. For the pipeline, the presently disclosed system may start with a machine learning model such as is outlined above. The presently disclosed system may then optimize the parameters of the model, seeking to maximize performance. With respect to an intAI model selection, the presently disclosed system may perform selection of the best classification pipeline model using an exhaustive search process over the possible combinations of algorithms and control parameters for each stage. At each point in the exhaustive search evaluation, the presently disclosed system may apply a data partitioning to use a portion of data for optimization and the remaining for cross-validation test. The main performance selection criterion is the average sensitivity/specificity for all the cross-validation tests. The presently disclosed system may perform deeper analysis on Classifiers, which may be individual software or hardware components or modules or combinations thereof, that have passed a performance threshold (e.g., find an operating point on the ROC with at least 95% sensitivity and maximum specificity among other Classifiers).

The final model is fine-tuned using the training set for best performance. After data partitioning, a portion of data for AI training and the remaining for validation of trained AI models. The parameters of each stage may be fine-tuned around the values selected in the previous step. The system may run this process multiple times to select the model with the best performance. The architecture of the models is the same but the control parameters for each stage are data-driven and determined by partitioning of the training data set. The presently disclosed system may validate the final model using the hold-out data set.

The presently disclosed system may employ multimode settings to cross-validate each mode of measurement. For instance, the presently disclosed system may acquire pure fluorescence measurements independent of light absorption (color) by reflectance and fluorescence in concurrent measurements By analyzing biological tissue, for example, using multimode methods, the presently disclosed system may, more accurately, differentiate the target of interest, and may analyze substantially more information, thus addressing a wider range of characteristics and drawing deeper and more discrete conclusions (i.e. more targeted and valuable signatures). The AI algorithm may train itself over time to be more efficient, where more efficient means higher accuracy and faster assessment.

One example of multimode spectral measurement involves the measurement of pure fluorescence spectra independent of light absorption. Natural fluorescence in food samples can be excited in multiple wavelength ranges. Examples include 278 nm (targeting Vitamin B2, tyrosine, and tryptophan), 305 nm (Targeting Vitamin B6, Vitamin F, and ATP), 365 nm (NADH, Vitamin A), 395 nm (hematoporphyrin), and 405 nm (chlorophyll). However, individual food sample may absorb light differently at excitation or emission wavelengths. By independently characterizing reflectance spectra, the system can minimize the absorption contribution to the fluorescence spectra and purify fluorescence spectral signatures.

A second example of multimode operation (multi excitation fluorescence) is to more effectively unmix the fluorophores contributions of the food sample. Usually, emission spectra of natural fluorophores are broad and overlap to other natural fluorophores. Multiple excitation wavelengths help to differentiate individual fluorophores. Some of the molecules have specific absorption characteristics that can be individually calculated and to be used to improve fluorescence unmixing progress. Thus, according to the present design, multimode may include using a single technique in varying ways, such as at different frequencies or wavelengths.

Machine Learning operation of the present system can identify which spectral features are important to differentiate between biological samples such as food samples. Such machine learning helps the Classifier to weight specific molecular, compositional components relative to each other for final classification. Machine learning also trains the expert system which combination of compositional, molecular, or chemical components becomes relevant and potentially important for classification optimization. Artificial intelligence in the system can establish a strategy where the classification can be optimized for either speed and/or accuracy by filtering most differentiating spectral features and removing the redundant data.

Figure 13:
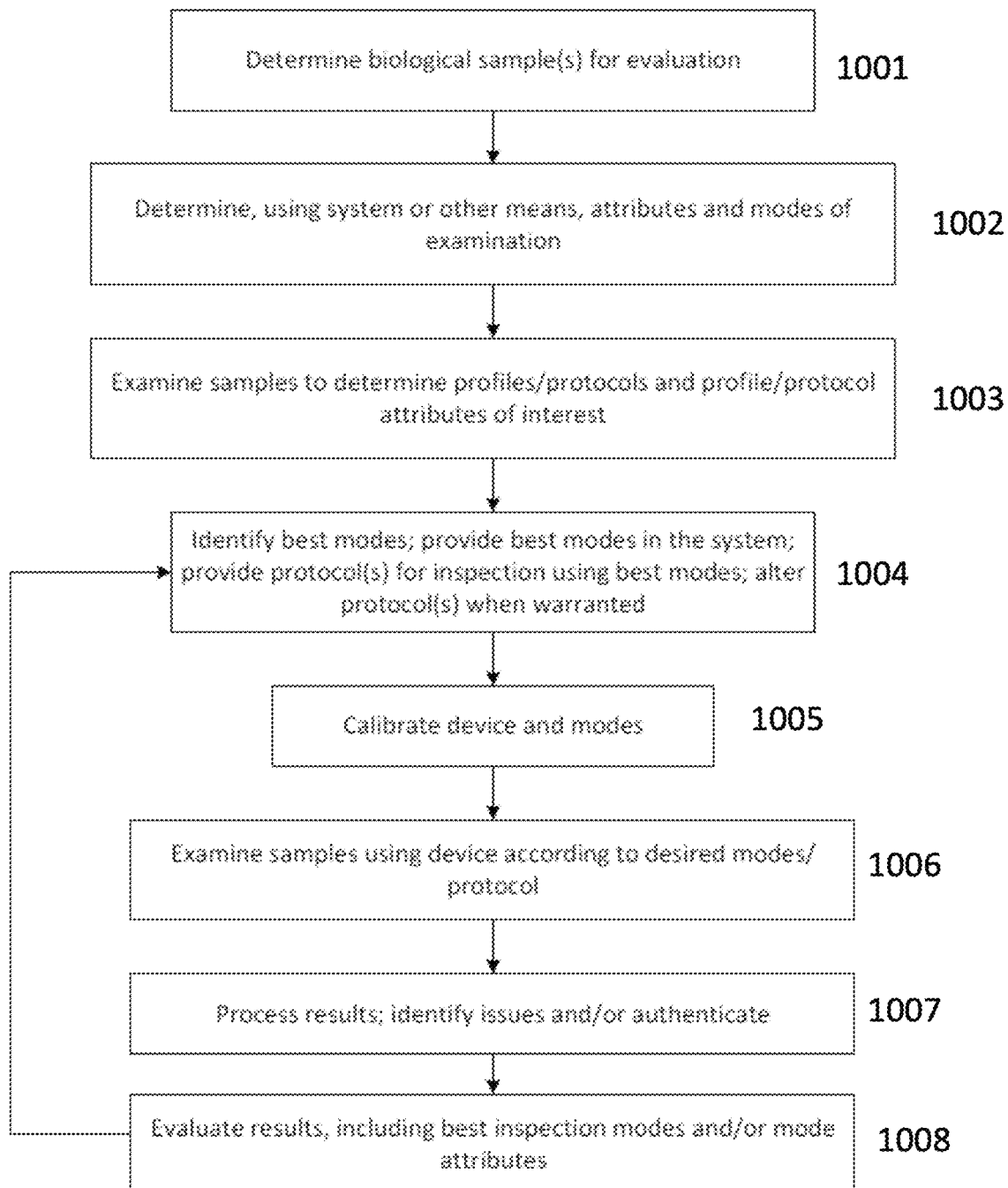
FIG. 13 depicts conceptual overview of operation according to some embodiments presently disclosed.

A general overview of the present design is thus presented in FIG. 13. At point 1001, the system determines the biological tissue for evaluation. This may be established by users or automatically, such as by a user being offered options and selecting those applicable. At point 1002, the system determines, using the components offered and/or other means, attributes of samples for examination and modes of examination. For example, a sample may call for examination using Raman spectroscopy and infrared scanning, either by experience or based on previous observations. In some instances, the samples be examined may have no known best mode used, and thus experimentation may be required to determine the desired use of mode X on sample Y Point 1003 is optional, wherein the system examines samples to determine sample profiles and profile attributes of interest. For example, a sample with a particular known contaminant may be examined using speckle imaging and it may be determined that when examining at a particular wavelength, the presence of the contaminant becomes particularly pronounced, and thus all samples may be examined using speckle imaging at the particular wavelength to determine the presence of the contaminant Alternately, if a biological sample such as a plant from a particular location exhibits an attribute under infrared imaging, similar plant samples may be examined using similar infrared imaging.

Point 1004 calls for identifying best modes and ensuring the best modes are available in the design. The various modes may be employed, but other modes may be provided as suggested. In some instances, examination in a single mode at various frequencies, wavelengths, or other measurement quantities may be employed. Such modes and examination attributes may be offered according to an examination and analysis protocol. If it is determined that samples of interest must be examined at wavelength P in mode Q, mode Q must be offered and must be able to operate at wavelength P. Point 1005 represents generally the initiation of production, i.e. the examination of multiple samples according to the present design, wherein the device and modes are calibrated. Point 1006 calls for examining samples using the device in the desired modes using the desired attributes, or in other words, according to the examination and analysis protocol.

At point 1007, the system processes results, including making assessments as to presence or absence of attributes, authentication probabilities, and so forth. Such processing employs the artificial intelligence and machine learning described herein. At point 1008, the system may evaluate and assess results, again using known attributes, machine learning, artificial intelligence, and/or other techniques. Results from this step importantly are fed back to point 1004, conceptually representing decisions to alter the examination and analysis protocol as well as the mode or modes employed. As an example, the system may process thousands of samples of beef using a given protocol, such as examining using reflectance multiwavelength imaging at three different wavelengths. However, examination at these wavelengths may offer limited results, such as a failure to determine the cut of beef being examined. In other words, results provided may be inconclusive. As a result, the system may augment the protocol and examination by adding a different mode or may add a wavelength to the three wavelengths used for examination. Thus, the present system employs feedback of determined results to improve the overall protocol and the overall examination and analysis process, and the protocol established may be dynamically changed depending on circumstances encountered.

Figure 12:
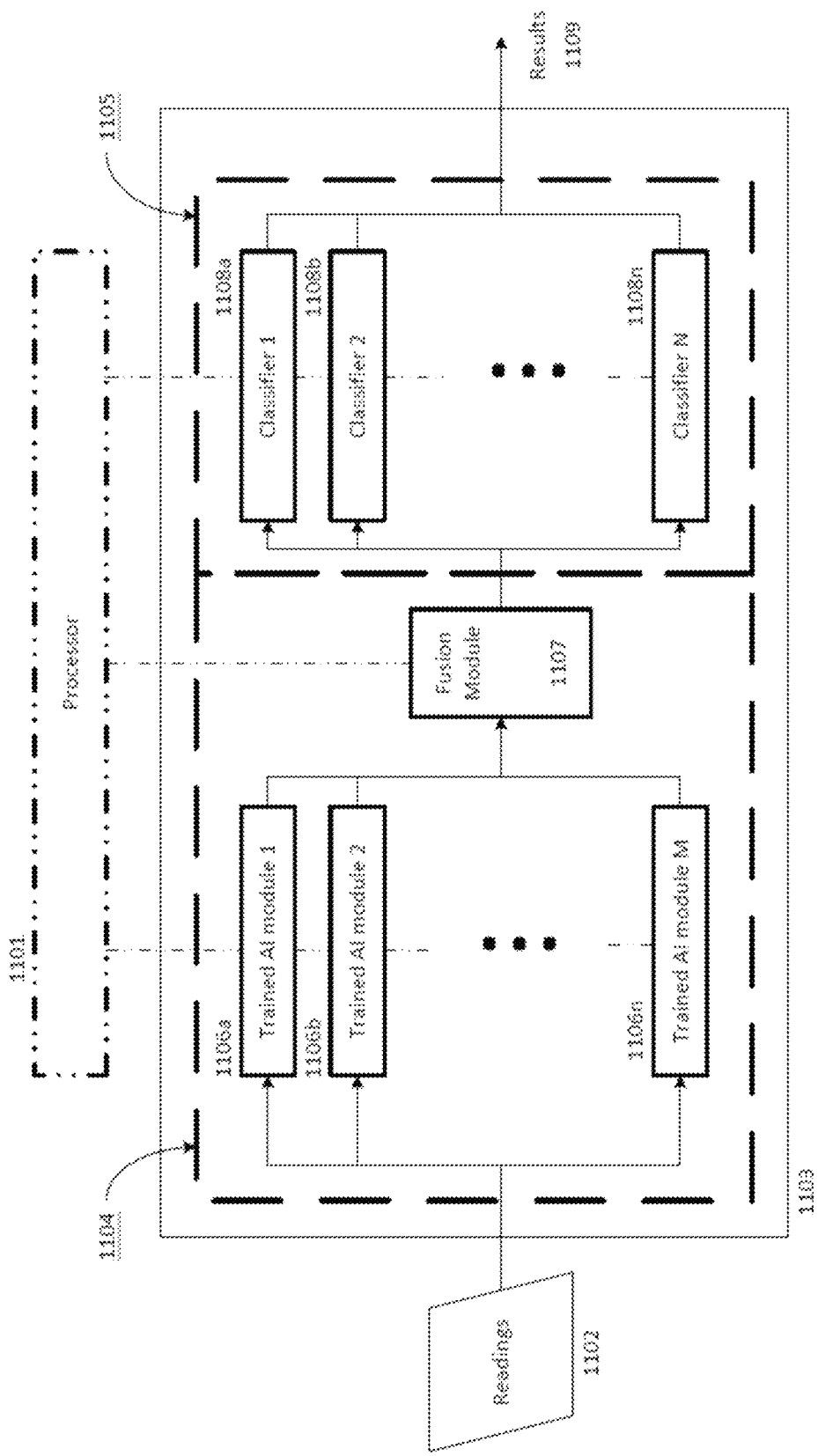
FIG. 12 depicts an alternative embodiments of the fusion artificial intelligence processing according to some embodiments presently disclosed.

FIG. 12 is a general overview of the processing modules employed. More or different modules may be employed. From FIG. 12, processor 1101 controls all processing, including applicable machine learning, artificial intelligence, and the like. Point 1102 represents readings taken, which are received by the processing arrangement 1103. Processing arrangement 1103 includes feature extraction module 1104 and classifier module 1105. The readings are received and distributed to the various internal AI training models 1106 *a* through 1106 *m* which generally identify known aspects and attributes from the readings based on experience and/or prior readings.

A single internal AI training model may be employed or offered. Fusion module 1107 fuses the results from the various internal AI training models 1106 *a* through 1106 *m*.

Classifiers 1108 *a* through 1108 *n* classify the fused results as described above, and overall results are provided at point 1109. Processor 1101 may then operate to provide the feedback shown in FIG. 10, determining that different modes and/or different assessments may be employed or different attributes examined, for example.

Thus according to one embodiment, there is provided a biological sample inspection apparatus, comprising an illumination hardware arrangement comprising transmission and sensing hardware, the illumination hardware arrangement configured to inspect a biological sample using at least two modes from a group comprising a fluorescence imaging mode, a reflectance imaging mode, a scattering imaging mode, and a Raman imaging mode, and processing hardware configured to operate the illumination hardware arrangement according to a protocol comprising inspection settings of the at least two modes, wherein the processing hardware receives scan results from the illumination hardware arrangement and identifies attributes of the biological sample. The processing hardware is configured to employ the attributes of at least one biological sample to alter the protocol.

According to a further embodiment of the present design, there is provided a method for inspecting at least one biological sample, comprising determining a plurality of inspection modes for inspecting the at least one biological sample using a multimode inspection apparatus, determining an inspection protocol for inspecting the at least one biological sample, wherein the inspection protocol comprises inspection settings for the plurality of inspection modes, inspecting the at least one biological sample using the multimode inspection apparatus according to the protocol, and altering the protocol based on inspection results for multiple biological samples.

According to another embodiment of the present design, there is provided a biological sample inspection apparatus configured to inspect a biological sample for issues, comprising illumination hardware comprising transmission and sensing hardware configured to illuminate and sense attributes of the biological sample, the illumination hardware configured to inspect the biological sample using multiple inspection configurations from at least one of a fluorescence imaging mode, a reflectance imaging mode, a scattering imaging mode, and a Raman imaging mode, and processing hardware configured to operate the illumination hardware according to a protocol comprising inspection settings for the multiple inspection configurations, wherein the processing hardware receives scan results from the illumination hardware and identifies attributes of the biological sample. The processing hardware is configured to employ the attributes of at least one biological sample and alter the protocol based on the attributes of the one biological sample.

Figure 14:
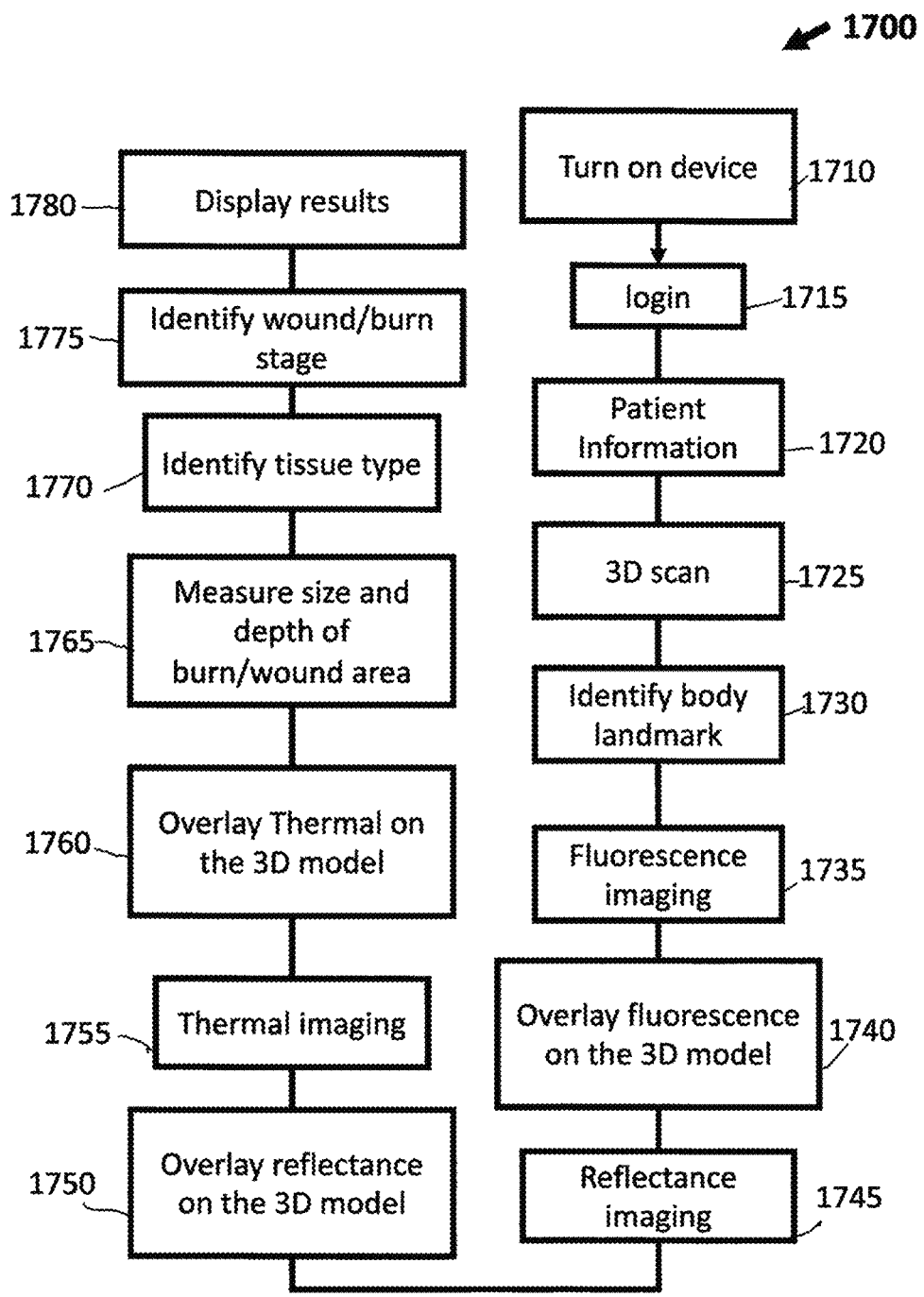
FIG. 14 depicts a method according to some embodiments presently disclosed.

Referring to FIG. 14, a method 1700 is shown according to some embodiments presently disclosed. At 1710, operator turns on device 10. At 1715, operator logs into a presently disclosed system running on the device 10. At 1720, operator enters patient's information or searches external server 90 and/or 95 to find patient's information. At 1725, operator uses one of the optical sensors of the device 10 to perform 3 dimensional (3D) scan an area of patient's skin affected by wound and/or burn and/or peripheral regions. At 1730, system running on device 10 identifies body landmarks. At 1735, operator uses another optical sensor of the device 10 to perform fluorescence imaging of the area of patient's skin affected by wound and/or burn and/or peripheral regions. At 1740, device 10 overlays fluorescence imaging (i.e. map) obtained at 1735 on the 3D model scanned at 1725 using landmarks identified at 1730. At 1745, operator uses a third optical sensor of the device 10 to perform reflectance imaging of the area of patient's skin affected by wound and/or burn and/or peripheral regions. At 1750, device 10 overlays reflectance image (i.e. map) obtained at 1745 on the 3D model scanned at 1725 using landmarks identified at 1730. At 1755, operator uses thermal cameral of the device 10 to perform thermal imaging of the area of patient's skin affected by wound and/or burn and/or peripheral regions. At 1760, device 10 overlays thermal imaging (i.e. temperature map) obtained at 1755 on the 3D model scanned at 1725 using landmarks identified at 1730. At 1765, device 10 measures size and/or depth of the area of patient's skin affected by wound and/or burn. At 1770, device 10 identifies tissue type (i.e. skin, fat, muscle, bone, etc. for each pixel on reflectance imaging, fluorescence imaging, and/or thermal imaging. At 1775, device 10 identifies and maps wound and/or burn stage based on the tissue molecular biomarkers, tissue type, wound and/or burn size, and/or sound depth. At 1780, device 10 displays results on the display 70 or another external computer display suing, for example, Wi-Fi or other video communication methods. The image results may be displayed on different panels, or overlays on 3D model. The operator may use image results to assess the wound and/or burn for more accurate treatment decision. The operator may use device 10 to transfer image results to server 90. The image results may also be shared with another clinician for further analysis.

Figure 15:
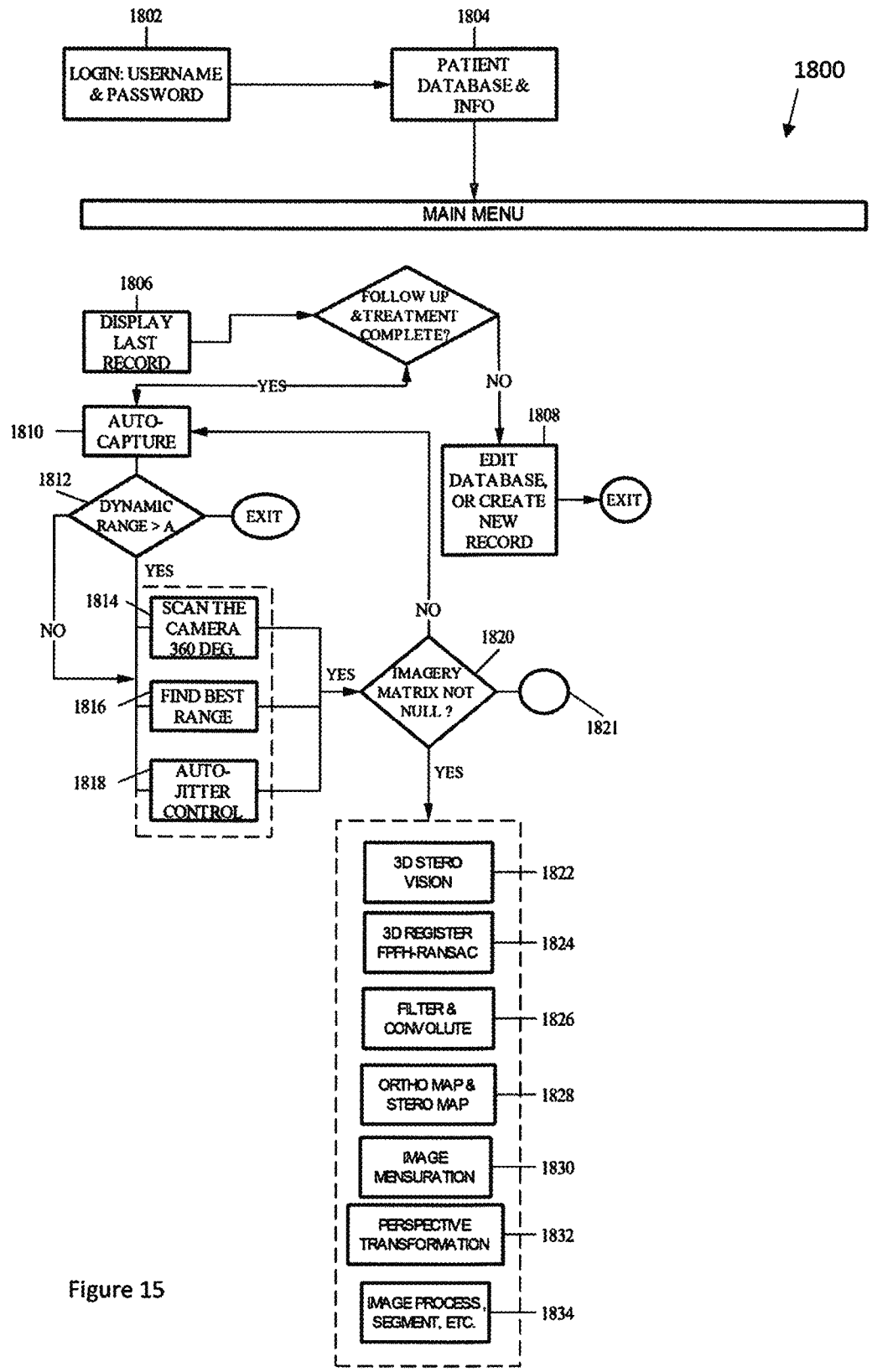
FIG. 15 depicts another method according to some embodiments presently disclosed.

Referring to FIG. 15, a method 1800 is shown according to some embodiments presently disclosed. At 1802, operator turns on and logs into a presently disclosed system running on the device 10. At 1804, operator enters patient's information (i.e. patient's data, and/or patient's record). Patient's information or portion of patient's information may be located in memory 74 of the device 10, a memory of the server 95 and/or a memory of the server 90. Patient's information may include patient's medical record(s) and/or patient's personal information. According to some embodiments, presently disclosed system or portion of the presently disclosed system may be stored in memory 74 of the device 10, a memory of the server 95 and/or a memory of the server 90. According to some embodiments, presently disclosed system or portion of the presently disclosed system may be processed by the processor modules 65 of the device 10, a processor of the server 95 and/or a processor of the server 90.

At 1806, patient's information may be viewed on the display 70 of the device 10 or on another external screen According to some embodiments, patient's information includes past tests performed by medical professionals, treatments performed and completed by medical professional, treatments that were started and not completed by medical professionals, and/or treatments that were not started by medical professionals. At 1808, operator may make changes to patient's information, updated patient's information, add new information (i.e. data) to the patient's record.

At 1810, operator may perform additional test(s) using the device 10. The additional test(s) to be performed may be listed in the patient's record viewed at 1806. The operator points device 10 towards patient's wound and or burn to capture a plurality of images. The device 10 may be activated to capture the plurality of images when the operator activates one or more controls 80. At 1812, the presently disclosed system determines if there is sufficient dynamic range (i.e. enough light) for the device 10 to obtain the plurality of images.

At 1814, the presently disclosed system scans patient's wound and or burn from 0 degrees to 360 degrees relative to the patient. At 1816, the presently disclosed system determines the distance the device 10 is from the patient's wound and or burn. Device 10 may use distance sensor 50 to determine the distance between the device 10 and the patient's wound and or burn.

At 1818, the presently disclosed system removes and/or compensates against any jitter and/or shaking that may be caused by the operator when using the device 10. This may be performed using one or more accelerometers 168, orientation sensor 40, one or more gyros, and/or motion sensor 35 within the device 10.

At 1820, the presently disclosed system may determine if there is enough data from the plurality of pictures to move to the next step. If there was not enough light, or the distance between the device 10 and the patient's wound and or burn was too far/close, or if there was too much shaking by the operator, the presently disclosed system may take the operator to 1810 to retake the pictures. At 1821, the presently disclosed system may provide a report to the operator showing why there is not enough data from the plurality of pictures. For example, at 1821, the presently disclosed system may notify the operator if the device 10 or any portion of the device 10 need to be recalibrated, notify the operator to bring the device 10 closer to the patient's wound and or burn, notify the operator to bring the device 10 further away from the patient's wound and or burn, notify the operator to keep the device 10 steady and/or to use a tripod to keep the device 10 steady, and/or may notify the operator if there is not enough power and the device 10 needs to be recharged.

According to some embodiments, the device 10 comprise one or more 3D stereoscopic imaging camera(s). Stereoscopic imaging camera comprises two sensors, spaced a first distance apart. Each sensor may operate at different wavelength. The stereoscopic imaging camera takes two images from the two sensors and compares them. Since the distance between the sensors is known, these comparisons provide morphological (i.e. depth) information. The 3D stereoscopic imaging camera may generate RGB (i.e. truecolor) and/or Infrared (IR) images. According to some embodiments, the device 10 may use thermal imaging camera 502 to provide IR images and/or thermal images.

If the presently disclosed system determines there is enough data in the pictures taken by the 3D stereoscopic imaging camera(s), at 1822, the presently disclosed system may perform 3D stereo vision analysis of the pictures taken at 1810 to generate (i.e. obtain) morphological information of the patient's wound and or burn. By comparing information about patient's wound and or burn from two vantage points, 3D information can be extracted by examining the relative positions of objects (i.e. landmarks) in the images. The two sensors of the 3D stereoscopic imaging camera, displaced the first distance from one another may be used to obtain two differing views on the patient's wound and or burn. By comparing images from the two sensors, the relative morphological information can be obtained in the form of a disparity map, which encodes the difference in coordinates (which could be vertical or horizontal) of corresponding image points. The values in this disparity map are inversely proportional to the scene depth at the corresponding pixel location.

At 1824, the presently disclosed system may perform 3D register Fast Point Feature Histograms (FPFH) and/or Random sample consensus (RANSAC) analysis of the pictures taken at 1810 to generate (i.e. obtain) a histogram of the patient's wound and/or burn. For example, the histogram may show different features of the light, color information, map of the scene of colors and possible image values associated with it. Random Sample Consensus (RANSAC) is an iterative method to estimate parameters of a mathematical model from a set of observed data that contains outliers. The FPFH-RANSAC ("Fast Point Feature Histograms (FPFH) for 3D Registration") in combination with odometry. Odometry is the use of data from motion sensors to estimate change in position over time.

At 1826, the presently disclosed system may perform filter and convolution analysis of the pictures taken at 1810 to filter and/or mask images in the pictures to, for example, determine (i.e. locate) edges of the patient's wound and or burn.

At 1828, the presently disclosed system may perform ortho mapping and/or stereo mapping of the pictures taken at 1810. Ortho Mapping is a process that corrects for geometric distortions inherent in remotely sensed imagery to produce ortho imagery products, raw images, and/or Ortho imagery products. Stereo mapping is a stereoscopy-enabled map that provides stereo vision through a stereo model, which is composed of two images of the same geographic area taken from two locations. Binocular stereo vision facilitates better image interpretation than singular mono vision and depth resolution.

At 1830, the presently disclosed system may perform image mensuration analysis of the pictures taken at 1810. Image mensuration applies geometric rules to determine distance, area of a 2-dimensional or 3-dimensional surfaces using the information obtained from lines and angles. It may also includes measuring the height and absolute location of a feature. According to some embodiments, image mensuration analysis may be used to identify landmarks on patient's wound and or burn. These landmarks may be used to overlap, overlay, and/or align different images.

At 1832, the presently disclosed system may perform perspective transformation analysis of the pictures taken at 1810. Perspective Transformation (Homography) may be used to change the perspective of a given image or video for getting better insights into the required information. In Perspective Transformation, one or more points are selected on the image from which to gather information by changing the perspective. Perspective transformation may also be used to remove image distortion.

At 1834, the presently disclosed system may perform image processing and/or segmentation analysis of the pictures taken at 1810 to analyze images pixel by pixel for variety of features.

Figure 16:
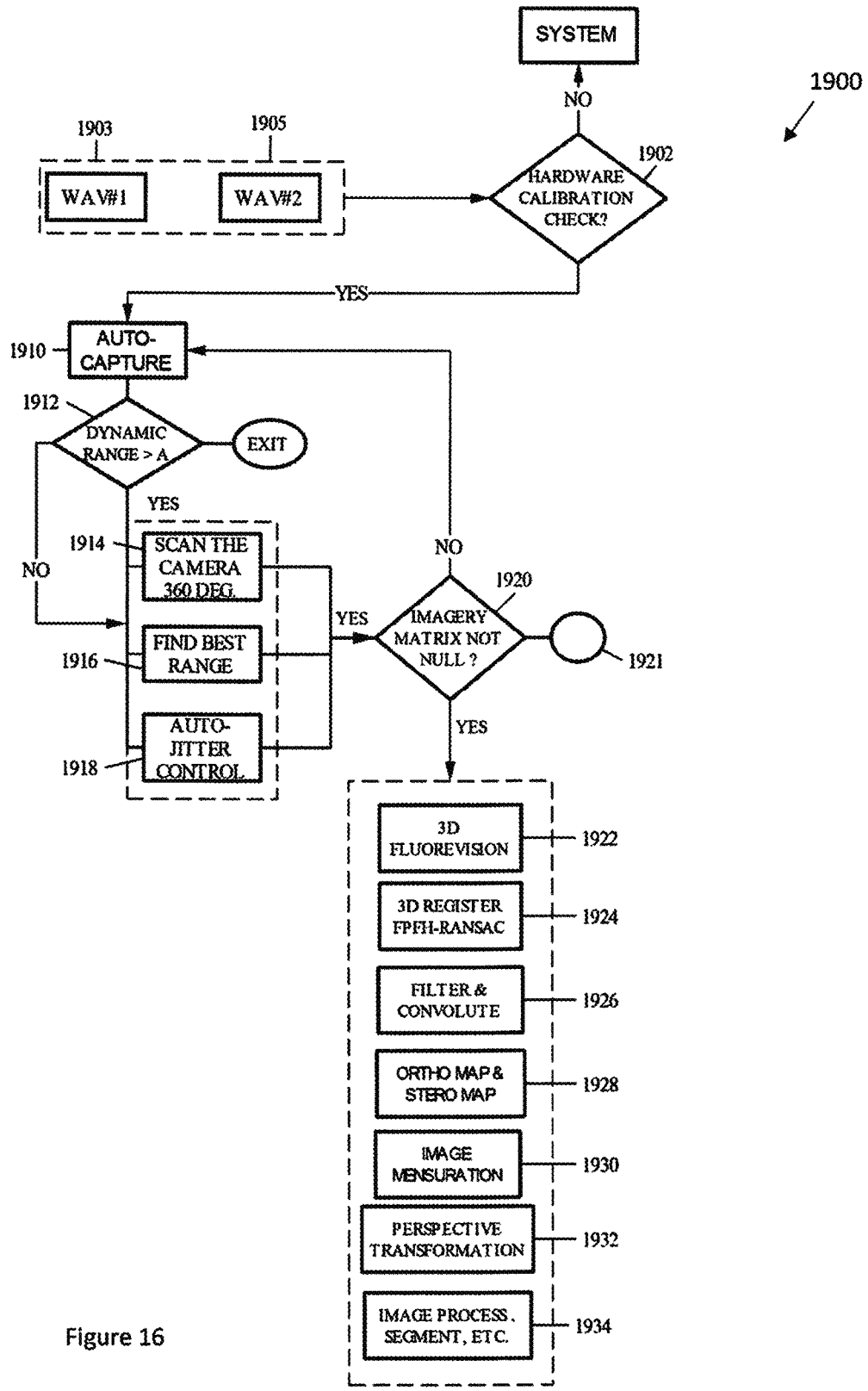
FIG. 16 depicts another method according to some embodiments presently disclosed.

Referring to FIG. 16, a method 1900 is shown according to some embodiments presently disclosed. The method 1900 may be used to detect infection located on the surface wound/burn, located on peri-wound, located subcutaneous and located inside the wound region. According to some embodiments, the method 1900 uses multi-modal fluorescence techniques to image, filter and process infection.

The operator turns on and logs into a presently disclosed system running on the device 10. The operator enters patient's information (i.e. patient's data, and/or patient's record). Patient's information or portion of patient's information may be located in memory 74 of the device 10, a memory of the server 95 and/or a memory of the server 90. Patient's information may include patient's medical record (s) and/or patient's personal information. According to some embodiments, presently disclosed system or portion of the presently disclosed system may be stored in memory 74 of the device 10, a memory of the server 95 and/or a memory of the server 90. According to some embodiments, presently disclosed system or portion of the presently disclosed system may be processed by the processor modules 65 of the device 10, a processor of the server and/or a processor of the server 90.

The patient's information may be viewed on the display 70 of the device 10 or on another external screen. According to some embodiments, patient's information includes past tests performed by medical professionals, treatments performed and completed by medical professional, treatments that were started and not completed by medical professionals, and/or treatments that were not started by medical professionals. The operator may make changes to patient's information, updated patient's information, add new information (i.e. data) to the patient's record.

At 1902, the presently disclosed system may perform hardware calibration check to confirm the hardware and/or software are calibrated and deice 10 functions properly.

At 1910, operator may perform fluorescence test(s) using the device 10. The fluorescence test(s) to be performed may be listed in the patient's record. The operator points device 10 towards patient's wound and or burn to capture a plurality of images. The device 10 may be activated to capture the plurality of images when the operator activates one or more controls 80. At 1912, the presently disclosed system determines if there is sufficient dynamic range (i.e. enough light) for the device 10 to obtain the plurality of images.

At 1914, the presently disclosed system scans patient's wound and or burn from 0 degrees to 360 degrees relative to the patient. At 1916, the presently disclosed system determines the distance the device 10 is from the patient's wound and or burn. Device 10 may use distance sensor 50 to determine the distance between the device 10 and the patient's wound and or burn At 1918, the presently disclosed system removes and/or compensates against any jitter and/or shaking that may be caused by the operator when using the device 10. This may be performed using one or more accelerometers 168, orientation sensor 40, one or more gyros, and/or motion sensor 35 within the device 10.

At 1920, the presently disclosed system may determine if there is enough data from the plurality of pictures to move to the next step. If there was not enough light, or the distance between the device 10 and the patient's wound and or burn was too far/close, or if there was too much shaking by the operator, the presently disclosed system may take the operator to 1910 to retake the pictures. At 1921, the presently disclosed system may provide a report to the operator showing why there is not enough data from the plurality of pictures. For example, at 1921, the presently disclosed system may notify the operator if the device 10 or any portion of the device 10 need to be recalibrated, notify the operator to bring the device 10 closer to the patient's wound and or burn, notify the operator to bring the device 10 further away from the patient's wound and or burn, notify the operator to keep the device 10 steady and/or to use a tripod to keep the device 10 steady, and/or may notify the operator if there is not enough power and the device 10 needs to be recharged.

The device 10 comprises multimodal light sources 55 that operate at least at two different wavelength 1903 and 1905. According to some embodiments, taking plurality of images (i.e. pictures) while flashing light sources 55 at different wavelengths 1903 and 1905 allows presently disclosed system to excite, detect and identify infection present in and around patient's wound and/or burn.

At 1922, the presently disclosed system may perform 3D fluorevision analysis of the pictures taken at 1910 to detect and identify infection present in and around patient's wound and/or burn.

At 1924, the presently disclosed system may perform 3D register Fast Point Feature Histograms (FPFH) and/or Random sample consensus (RANSAC) analysis of the pictures taken at 1910 to generate (i.e. obtain) a histogram of the patient's wound and/or burn. For example, the histogram may show different features of the light, color information, map of the scene of colors and possible image values associated with it. Random Sample Consensus (RANSAC) is an iterative method to estimate parameters of a mathematical model from a set of observed data that contains outliers. The FPFH-RANSAC ("Fast Point Feature Histograms (FPFH) for 3D Registration") in combination with odometry. Odometry is the use of data from motion sensors to estimate change in position over time.

At 1926, the presently disclosed system may perform filter and convolution analysis of the pictures taken at 1910 to filter and/or mask images in the pictures to, for example, determine (i.e. locate) edges of the patient's wound and or burn.

At 1928, the presently disclosed system may perform ortho mapping and/or stereo mapping of the pictures taken at 1910. Ortho Mapping is a process that corrects for geometric distortions inherent in remotely sensed imagery to produce ortho imagery products, raw images, and/or Ortho imagery products. Stereo mapping is a stereoscopy-enabled map that provides stereo vision through a stereo model, which is composed of two images of the same geographic area taken from two locations. Binocular stereo vision facilitates better image interpretation than singular mono vision and depth resolution.

At 1930, the presently disclosed system may perform image mensuration analysis of the pictures taken at 1910. Image mensuration applies geometric rules to determine distance, area of a 2-dimensional or 3-dimensional surfaces using the information obtained from lines and angles. It may also includes measuring the height and absolute location of a feature. According to some embodiments, image mensuration analysis may be used to identify landmarks on patient's wound and or burn. These landmarks may be used to overlap, overlay, and/or align different images.

At 1932, the presently disclosed system may perform perspective transformation analysis of the pictures taken at 1910. Perspective Transformation (Homography) may be used to change the perspective of a given image or video for getting better insights into the required information. In Perspective Transformation, one or more points are selected on the image from which to gather information by changing the perspective. Perspective transformation may also be used to remove image distortion.

At 1934, the presently disclosed system may perform image processing and/or segmentation analysis of the pictures taken at 1910 to analyze images pixel by pixel for variety of features.

According to some embodiments, presently disclosed system may perform fluorescence imaging using wavelength 1903 and wavelength 1905 at any of the wavelength described below to test for biological markers, bacteria, infection, tissue, etc. For example, presently disclosed system may perform fluorescence imaging using violet light where wavelength 1903 is at 405 nm and UVA light where wavelength 1905 is at 365 nm.

Endogenous fluorophores are label-free biological markers of human cells and tissues as well as bacteria that intrinsically emit fluorescence upon excitation by a convenient wavelength. This phenomenon is called autofluorescence (AF). AF or intrinsic fluorescence biomarkers include reduced nicotinamide adenine dinucleotide (NAD(P)H), oxidized flavins (FAD and FMN), porphyrins, collagen, elastin, and other metabolites. These fluorophores have excitation maxima of 325-500 nm and emission maxima at longer wavelength (390-700 nm) regions of the spectrum. The majority of tissue fluorophores, such as collagen cross-links, NADH, elastin, oxidized flavins, and porphyrins, may be excited by ultraviolet A (UVA: 355 nm). Bacterial intrinsic biomolecules, including NADH and FAD, also fluoresce following the excitation by UV light. Collagen, porphyrins, and pyoverdines have excitations at 405 nm (violet light) and emissions at 420-700 nm.

Extracellular matrix proteins of connective tissue (e.g., collagen, elastin, and fibrin) fluoresce in the green and yellow regions of the visible spectrum after excitation at 405 nm. The color shade is varied depending on the relative density of collagen, elastin, and their degree of cross-linking. A higher concentration of melanin in darker skin tones attenuates the tissue green fluorescence. Slough with high levels of fibrin displays bright green after excitation at 405 nm while flaky skin is green with thin white edges indicating the flakes. Tendons and bones with the highest levels of collagen fluoresce very bright green to glowing white. Hemoglobin absorbs the violet light resulting in the dark black or maroon color of the blood or highly vascular tissue. Dead or necrotic tissues are greatly decomposed and black in reflectance and violet light images.

The amounts of fluorophores are variable based on bacterial types and their microenvironments[49]. At critical bacterial loads ($\geq 10^4$ CFU/g), most pathogenic bacteria emit red fluorescence, although *Pseudomonas aeruginosa* can be indicated by cyan fluorescence upon excitation at 405 nm. Siderophore pyoverdines are bacterial iron-chelating molecules that facilitate microbial colonization and infection. Pyoverdine is the extracellular siderophore secreted by *Pseudomonas aeruginosa* and emits blue-green (cyan) at 430-530 nm with the emission peak at 455 nm upon maximal excitation at 395 nm. Porphyrins are intermediate molecules in the bacterial and mammalian heme biosynthetic pathway. Bacterial endogenous porphyrins are associated with the virulence of pathogens and emit red fluorescence when excited by UV and violet lights. Many gram-positive and gram-negative bacteria produce porphyrins, which emit fluorescent at two maxima of 618-620 and 680 nm upon excitation at 405 nm. NADH/NAD(P)H, a metabolic coenzyme, has excitation maxima at 350/380 nm and emission at 400-500 nm with a strong peak at 470 nm producing blue fluorescence. The excitation and emission wavelengths are variable and depend on the microbial strain and metabolic state. Flavins or flavoproteins (FAD) excite at 420-500 nm and emit green fluorescence at 500-600 nm with a strong emission peak around 525 nm. Due to the higher concentration of NADH and flavins, gram-negative bacteria can be differentiated from gram-positive microorganisms. Using multiple excitation wavelengths, gram-negative bacteria can be detected in green while gram-positives emit red fluorescence.

Figure 17:
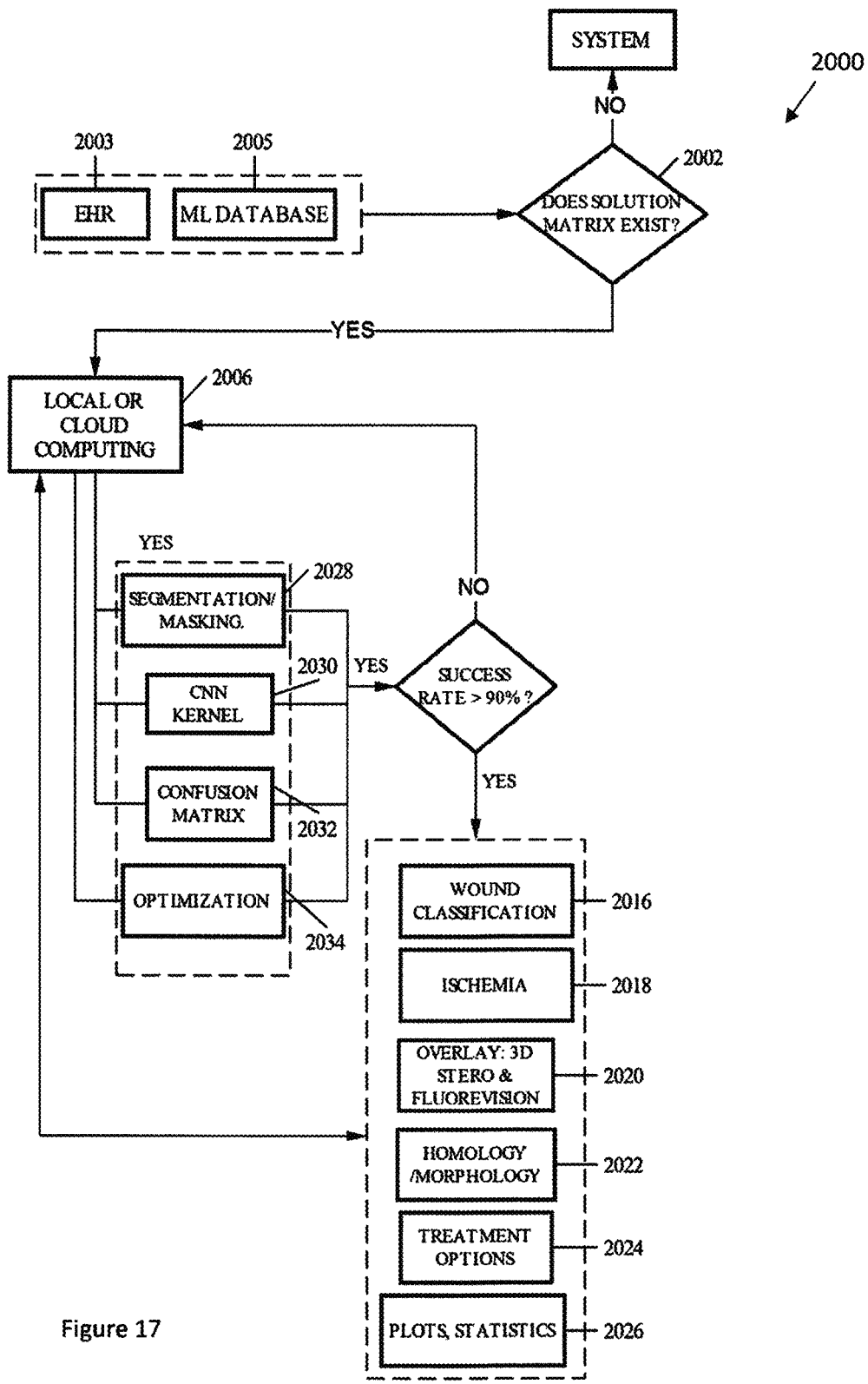
FIG. 17 depicts another method according to some embodiments presently disclosed.

Referring to FIG. 17, a method 2000 is shown according to some embodiments presently disclosed. The method 2000 may be used to generate one or more reports pertaining to patient's wound and/or burn based on analyzes of pictures taken at 1810, and/or taken at 1910, and/or stored in the memory 74 of the device 10, and/or stored in the memory of the server 95, and/or served in the memory of the server 90. According to some embodiments presently disclosed, the method 2000 may utilize machine learning and/or artificial intelligence to analyzes of pictures and generate one or more reports pertaining to patient's wound and/or burn. According to some embodiments presently disclosed, the pictures taken at 1810, and/or taken at 1910, and/or stored in the memory 74 of the device 10, and/or stored in the memory of the server 95, and/or served in the memory of the server 90 are part of machine learning database 2005. According to some embodiments presently disclosed, presently disclosed system utilizes patients' electronic health records (i.e. medical records) 2003 and the database 2005 in the method 2000.

According to some embodiments presently disclosed, presently disclosed system utilizes patients' electronic health records (i.e. medical records) 2003, the database 2005, and kernel at 230 to evaluate diagnostic meta data.

The operator turns on and logs into a presently disclosed system running on the device 10. The operator enters patient's information (i.e. patient's data, and/or patient's record) Patient's information or portion of patient's information may be located in memory 74 of the device 10, a memory of the server 95 and/or a memory of the server 90. Patient's information may include patient's medical record(s) and/or patient's personal information. According to some embodiments, presently disclosed system or portion of the presently disclosed system may be stored in memory 74 of the device 10, a memory of the server 95 and/or a memory of the server 90. According to some embodiments, presently disclosed system or portion of the presently disclosed system may be processed by the processor modules 65 of the device 10, a processor of the server 95 and/or a processor of the server 90.

The patient's information may be viewed on the display 70 of the device 10 or on another external screen. According to some embodiments, patient's information includes past tests performed by medical professionals, treatments performed and completed by medical professional, treatments that were started and not completed by medical professionals, and/or treatments that were not started by medical professionals. The operator may make changes to patient's information, updated patient's information, add new information (i.e. data) to the patient's record.

At 2002, the presently disclosed system may confirm that records 2003 and database 2005 are available. At 2006, the presently disclosed system performs computation and analysis of the records 2003 and database 2005. The presently disclosed system may perform computations using, fully or in part, the processor module 65 of the device 10, and/or a processor of the server 95, and/or a processor of the server 90.

Figure 18:
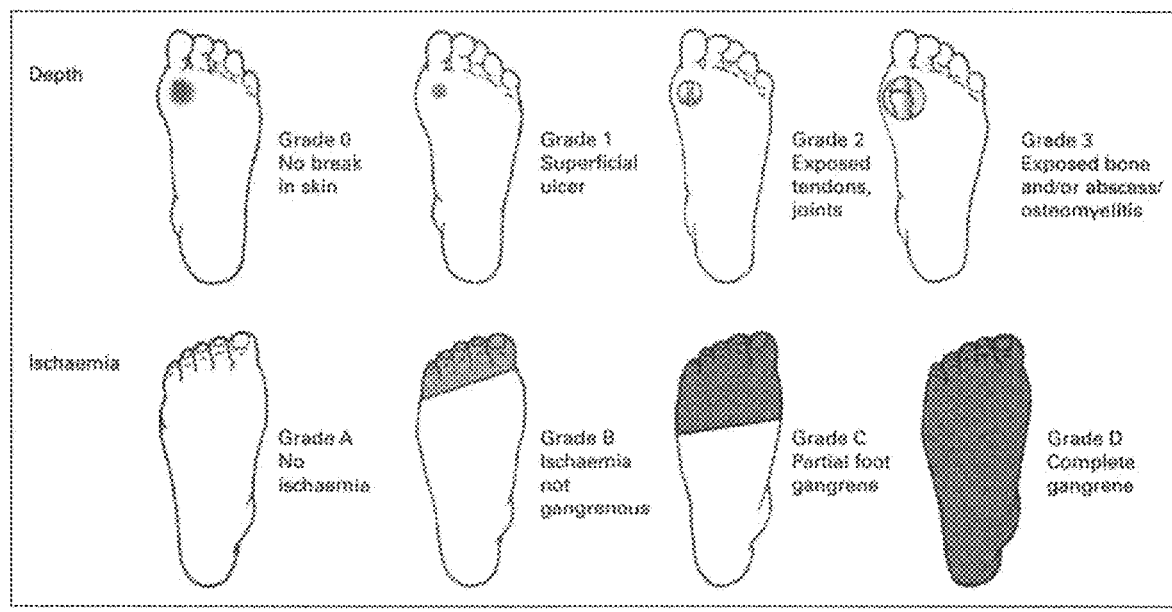
FIG. 18 depicts different classification grades for a wound.

At 2016, the presently disclosed system may perform wound classification analysis based on the one or more pictures in the database 2005. Medical clinicians classify wounds based on whether or not patient's skin is broken, whether or not bone and/or tendons are exposed. FIG. 18 depicts different classification grades for ulcer and different classification grades for ischemia. Based on the analysis of the database 2005, and results of methods 1800, and/or 1900, presently disclosed system assigns one or more classification grades to patient's wound and/or burn According to some embodiments, presently disclosed system generates a report identifying classification grades for patient's wound and/or burn, and may suggest treatment to prevent the wound from getting worse.

At 2018, the presently disclosed system may perform ischemia analysis based on the one or more pictures in the database 2005 to determine if enough blood and/or oxygen is being supplied to patient's wound and/or burn Dark skin areas around patient's sound and/or burn signify lack of oxygen being supplied to the patient's wound and/or burn. According to some embodiments, presently disclosed system generates a report identifying ischemia, and may suggest treatment to prevent the wound from getting worse.

At 2020, the presently disclosed system may overlay images taken at 1822 over images taken at 1922 to generate a picture of the patient's wound and/or burn and show if there is any infection. Overtime, pictures generated at 2020 may be compared by the presently disclosed system to each to determine of the size of the wound is getting smaller or bigger, and/or if the amount if infection is increasing or decreasing.

At 2022, the presently disclosed system may perform homology/morphology analysis based on the one or more pictures in the database 2005 to determine shape and/or depth of the patient's wound and/or burn.

At 2024, the presently disclosed system may provide treatment options (i.e. report) based on the result at 2016, 2018, 2020, and/or 2022. At 2026, the presently disclosed system may provide plots statistics of healing progress of the patient's wound and/or burn.

At 2028, the presently disclosed system may use segmentation masking analysis to analyze pictures in database 205 pixel by pixel. At 2030, the presently disclosed system may use, for example Convolutional neural network (CNN) kernel engine to analyze images analyzed at 2028. At 2032, the presently disclosed system may use confusion matrix analysis to evaluate and/or determine number of false positives and/or false negatives results. At 2034, the presently disclosed system may optimize for faster processing.

According to some embodiments, the presently disclosed system performs segmentation masking analysis at 2028, apply kernel engine at 2030, apply confusion matrix at 2032, and/or optimization at 2034 on the database 2005 to generate wound classification at 2016, ischemia report at 2018, overlay at 2022, provide treatment options at 2024, and/or provide plot statistics at 2026.

Figure 19:
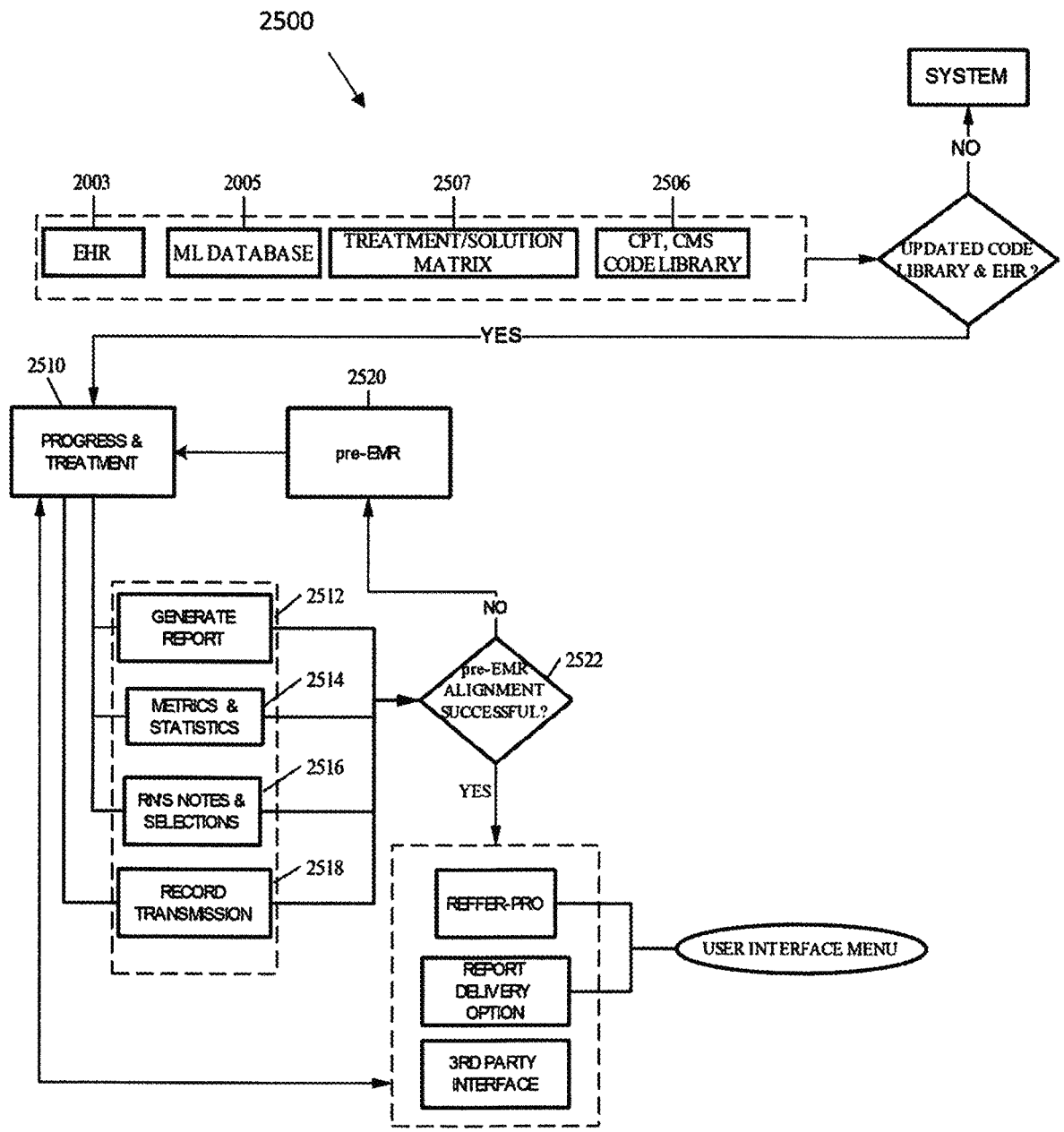
FIG. 19 depicts another method according to some embodiments presently disclosed.

Referring to FIG. 19, a method 2500 is shown according to some embodiments presently disclosed. According to some embodiments, the method 2500 may be used to assign billing code(s) to patient's wound and/or burn based on the wound condition identified, for example, at 2016. Billing codes may be insurance specific billing codes or Medicare and Medicaid Services (CMS) billing codes.

According to some embodiments, presently disclosed system and method 2500 collect data from patient records at 2003, wound classification at 2016, and/or treatment matrix at 2024 and correlates this data to billing code library 2506. The billing code library 2506 may be periodically updated to have the most updated list of codes. The billing code library 2506 may be stored in memory 74 of the device 10, in memory of the server 90, and/or memory of the server 95. According to some embodiments, method 2500 has access to treatment matrix 2507 generated, for example, at 2016, 2018, 2022, 2024 and/or 2026.

At 2510, the presently disclosed system obtains progress and treatment data from records 2003, database 2005, matrix 2507. At 2512, the presently disclosed system generates a report containing healing progress of the patient's wound and/or burn, treatment for the patient's wound and/or burn, and a billing code that from library 2506 that corresponds to treatment of the patient's wound and/or burn and/or billing code for examination and/or testing of the patient's wound and/or burn. The report at 2512 may be generated based on results from method 1800, 1900, and/or 2000. The billing code(s) are added to the report at 2512 from the library 2506 at 2520.

At 2514, the presently disclosed system may provide metrics and statics generated based on results from method 1800, 1900, and/or 2000. At 2514, the presently disclosed system may provide notes made by operator of the device 10 and/or any other medical professional. At 2518, the presently disclosed system may transmit patient's record to another medical professional or insurance company.

At 2514, the presently disclosed system may determine if the correct billing code was properly applied. At 2514, the presently disclosed system may determine if patient should be referred to another medical professional for additional treatment(s). At 2514, the presently disclosed system may allow the one or more generated reports to be emailed, printed, or otherwise transmitted. At 2514, the presently disclosed system may provide one or more reports to $3^{rd}$ party system for billing, hospital or another medical professional.

According to some embodiments, presently disclosed system uses pulsating light to remove ambient light fluorescence (infection, metabolism, and fluorescence endogenous or exogenous). The image can be easily contaminated by the presence of ambient light while capturing fluorescence images. Ambient light refers to the light from a surrounding scene or a situation. Light that may come in through a window, from a ceiling lamp, or other source of illumination are all examples of ambient light. To obtain an uncontaminated fluorescence image it may be necessary to remove the ambient light. The fluorescence signal captured in images or by spectroscopy measurements has diagnostic or analytical significance when the light that is not from the biological tissue is removed.

There are multiple methods to remove undesired ambient light from an image or a spectroscopy measurement of a biological tissue being analyzed. One exemplary way is to capture an image of the subject with the fluorescence excitation light turned off and then capture an image with the fluorescence excitation light turned on. The background ambient light can be removed from the fluorescence image by subtracting the image with no excitation illumination from the image with excitation illumination. Ambient light can also be subtracted by applying weighted-subtraction and machine-learning approaches.

According to some embodiments, presently disclosed system may change the image capture system exposure time to accurately capture both the ambient light and fluorescence images without them being too dark or too light. These images can be scaled for the correct or relevant amount of subtraction according to their exposure times. A control or calibration target and other apriori information obtained from the ambient light using an image of a reference surface can be used to appropriately scale the exposure time or speed the image acquisition time.

According to some embodiments, presently disclosed system provides multi biomarker measurements in a handheld device 10. According to some embodiments, presently disclosed system is a multi-mode portable imaging system comprising the optical measurement modes of tissue fluorescence, tissue reflectance, thermal imaging, and three-dimensional imaging. Tissue fluorescence is a result of the absorption by tissue molecules of a higher energy photon and the emission of a lower energy photon. The relative response of different wavelengths illuminating and emitted by tissue fluorophores can allow identification or classification of the tissue. Tissue reflectance refers to the portion of illumination light remitted from a tissue. Light remitted from a tissue can include light remitted by diffuse or specular reflection from the surface of the tissue or light remitted through scattering processes (e.g., reflectance through backscatter). Thermal imaging is the measurement of infrared light emitted from tissue according to its temperature. Three-dimensional imaging refers to methods to capture an image of an object that measures the topology or shape of the object. Examples of three-dimensional image capture devices include laser scanning systems, structured illumination systems, photogrammetry, and LIDAR 50 image capture systems. To detect multiple biomarkers relevant to a physiological area of interest [e.g., a limb or an area of skin], both light sources 55 and optical sensors 25, 30 can be used for fluorescence or reflectance imaging.

Light sources 55 or optical sensors can be applied for both reflectance and fluorescence imaging. Selection of light source 55 wavelengths or selection of optical sensors optical filters may be applied in various combinations to capture fluorescence or reflectance information of interest.

According to some embodiments, presently disclosed system comprises the handheld device 10 that is capable of measuring optical characteristics of wounds for diagnostic and treatment purposes. According to some embodiments, the handheld device can identify the location as well as the concentration of multiple metabolic biomarkers, such as NADH and FAD. FAD and NADH are autofluorescent coenzymes of the mitochondrial respiratory chain whose levels increase with high blood glucose. Additionally, the device 10 may identify the location and characteristics of tissue structural components, such as collagen. The device 10 may also detect the presence of tissue infection, such as porphyrin-producing bacteria found in biofilms and measure bacterial load of a wound. According to some embodiments, presently disclosed system measures the oxygenation status of tissue (the relative amount of oxy- and deoxyhemoglobin) and elucidate other structural features such as blood vessel networks.

According to some embodiments, presently disclosed system provides 3D mapping of wound and body anatomy, i.e. calluses, moles, scars, skin conditions etc. According to some embodiments, presently disclosed system comprises multimode imaging system that reconstructs the three-dimensional geometry and topology of a limb or surface feature, such as a callus, mole, scar, skin chronic conditions (psoriasis, eczema, etc), wound, ulcers, limb, burn, military related wound, chemical burn etc.

According to some embodiments, multimode imaging or multimode point spectroscopy measurements of skin can be used for many kinds of skin illnesses or injuries, including skin chronic conditions (e.g., psoriasis, and eczema, atopic dermatosis). Multimode imaging can detect distinct structural features related to these conditions, such as disruption and alteration of skin surface texture, and raised or uneven skin areas. According to some embodiments, presently disclosed system may be used to identify such abnormalities and other characteristics, such as color, oxygenation status, metabolic biomarkers, and structural features derived from fluorescence and reflectance imaging as well as 3D imaging modes.

According to some embodiments, the multimode imaging system can be applied for imaging of both chronic and acute wound types. Diabetic and pressure ulcers are examples of chronic wounds, while acute wounds include accidental wounds, such as weapon assaults, automobile accidents or workplace injuries. Acute wounds also include surgical wounds (e.g., intentional skin incisions or excisions for treatment purposes). According to some embodiments, presently disclosed system can also document the characteristics, shape, and structure of the wound. This is particularly useful for billing for medical procedures. The gradual process of wound healing can also be documented by imaging overtime changes in wound parameters, including dimensions, quantification of collagen regeneration and cross-linking, metabolic activity of the peri-wound area, and other characteristics of skin regeneration.

According to some embodiments, presently disclosed system provides image registration of multiple biomarkers on tissue. Presently disclosed multimode imaging systems may use multiple cameras (i.e. optical sensors) or other image capture systems, such as 3D imaging.

According to some embodiments, presently disclosed system correlates information captured in each of the multiple modes with its real-world location on the human anatomy. According to some embodiments, presently disclosed system registers and maps the data to the correct location on the resulting clinical model of the surface of the skin or anatomical feature being examined. According to some embodiments, presently disclosed system translates and/or scales images so that they overlap exactly. Scaling of images can compensate for camera characteristics that create different image sizes or different fields of view to map them to a common spatial scale. Translation of images involves shifting and/or rotating the x and y coordinates of an image so that image pixel locations are mapped to their common features in another image. According to some embodiments, presently disclosed system registers multiple two-dimensional images by translation and warping to accurately register them to common physiological features on a 3D reconstruction model of the tissue.

According to some embodiments, presently disclosed system determines oxygenation independent of skin color. One of the characteristic of multimode imaging is the ability to use the different modes of optical measurement to augment data from the other modes. For example, melanin interferes with the accuracy of oxygenation measurements when image is captured through the skin, particularly around wounds. Historically, many optically-based tissue oxygenation measurements have not worked well on people with darker skin. This is because the melanin in the basement membrane and in the epidermis absorbs light broadly. Areas highly pigmented with melanin produce confusion in interpreting the optical measurement of oxyhemoglobin.

According to some embodiments, presently disclosed system compensates for the effect of melanin absorption on the determination of the oxy/deoxy hemoglobin ratio. By using multimode measurements, the presently disclosed system can determine the relative contributions of different chromophores in the tissue. Multimode measurements may also be used to compensate for variability of the quality of an individual mode of measurement through cross-referencing. For example, understanding the melanin concentration through multimode imaging helps to subtract it or take it into account in some other way in order to produce a more accurate measurement of underlying fluorescence. Fluorescence measurements at multiple wavelengths can be scaled in response to the relative melanin contribution. To investigate blood vessel networks, reflectance imaging (sometimes accompanied with polarization) can be used. Blood vessel networks can also be detected using fluorescence imaging. The intensity to which fluorescence is quenched by the blood vessel networks can be used to augment reflectance and backscattered light imaging. In this way, the multiple modes may determine the contribution of the many different biomarkers in tissue and to map them appropriately on the surface of the skin.

Another mode of imaging in the multimode system provides 3D imaging of the skin. This mode determines the impact of the surface topology of the skin, such as the curvature of the skin, on the measurements being made. For example, diffuse reflectance and backscatter from skin is very dependent on the angle of incidence between the light hitting the skin and the light coming back. This can affect the relative intensity. By compensating for the three-dimensional shape and understanding the angle of the skin between the imaging device and the tissue, presently disclosed system may correct for the relative response using, for example, Lambert's law and the cosine response.

According to some embodiments, presently disclosed system provides image analysis of multi-biomarkers. According to some embodiments, presently disclosed system offers additional advantages in that information gained from the image registration on a three-dimensional surface model can be further applied using machine learning techniques. According to some embodiments, presently disclosed system provides artificial intelligence machine learning algorithms for detection, localization, and classification of important skin features. According to some embodiments, presently disclosed methods can be deployed in real time on imaging devices to recognize and identify physiological conditions.

According to some embodiments, presently disclosed system provides 3d measurement (stereoscopic imaging, LIDAR, etc), Range finder, gyroscope, motion sensor, wound objective measurements, longitudinal wound/lesion size analysis, and/or topographic analysis. One of the modes of imaging used in the presently disclosed system may be the 3D measurement. This can be accomplished in multiple ways for application in multimode imaging. For instance, while multiple images of a surface are taken, a LIDAR system could measure the distance from the camera to the surface being imaged. Other sensors in the presently disclosed system could measure the angle, orientation of the camera, and any movements since previous measurements, to understand the circumstances in which these images are captured in 3D space. This information can further be used to reconstruct the 3D image of the biological tissue being examined. In another mode of imaging, there can be multiple cameras (i.e. optical sensors) in the presently disclosed system. These cameras can be sensitive to different biomarkers and different optical characteristics of the tissue. These cameras can capture a spatial image of the tissue, simultaneously. Since these cameras are offset from one another and may be side-by-side, stereoscopic imaging can be further used to reconstruct three-dimensional structure of the features in the image. Other modes of stereoscopic imaging can also be accomplished using cameras with sensors that incorporate multiple pixels that are directionally sensitive. The pixels are offset from one another and can generate two image fields of a system from slightly different angles that can be applied to stereoscopic imaging and photogrammetry.

Another method of three-dimensional imaging is scanning LIDAR imaging. This method comprises a raster scanning laser and works based on the angle and time when the sensor receives the laser signal and that is used to measure the distance between the object and the sensor. Another method of three-dimensional imaging uses structured light (e.g., DLP scanning system) projected to create arrays of lines or points on the object being imaged, can measure the surface topology of the object being imaged from the distortion of the reference array, while images of the object surface are captured using IR and/or other wavelengths.

According to some embodiments, presently disclosed system may use multiple sensors and multiple multimode images for reconstruction into a multidimensional image cube or hyper cube incorporating functional, spatial and structural, and even temporal dimensions. This provides a single data analysis framework that can be used to interpret the progress of a wound or lesion or burn on an anatomical feature such as a foot by examining dimensional and structural changes, metabolic changes, blood vessel network changes, and healing processes such as collagen remodeling.

According to some embodiments, longitudinal measurements may be used to examine the progress of wound or lesion. The measurements can be used in proactive diagnostic way to capture wound that is progressing to become more severe. Also, they can be applied for monitoring the wound healing, as it becomes less severe and heals.

According to some embodiments, presently disclosed system may use Blockchain, trust certificate of image analysis data of multiple biomarkers. One aspect of the development of electronic health records and the review of images across institutions and over time, is understanding and being certain that the image information is accurately associated with the time in which it was captured, and the patient from which it was captured. Blockchain provides a method to create trust certificates of image analysis data that can improve data security and the correct interpretation and understanding of the progression of a wound or the healing of a wound following surgery. This makes sure that a clinician reviewing any image data or patient information has an accurate representation of that data. It can also be useful in assigning costs and times for reimbursement and an assessment of appropriate treatment plans.

According to some embodiments, presently disclosed system may use Federated learning, Machine learning (ML), Artificial intelligence (AI) confidentiality of image analysis data of multiple biomarkers. According to some embodiments, presently disclosed system includes the handheld multimode imaging device and a system component for managing, storing, and aggregating data incorporated in the system. According to some embodiments, presently disclosed system comprises a system processor with data storage that can be wirelessly connected to the handheld multimode imaging device 10. This system processor can be a virtual system, such as a cloud server, or a physical system, such as a laptop computer. The system processor provides operator interfaces and methods to review and input data. The system also provides the ability to communicate with multiple handheld imaging devices. The system further provides the ability to communicate between multiple servers each hosting multiple handheld imaging devices.

According to some embodiments, presently disclosed system provides the ability to collect and analyze data to improve the accuracy of the imaging algorithm over time. According to some embodiments, presently disclosed learning systems can be hosted solely in the system processor, or they can be distributed among multiple system processors of multiple customers. According to some embodiments, presently disclosed system provides the ability to distribute learning systems across multiple customer system processors while maintaining the privacy of their data using, for example, the method of "Federated Learning" to improve the accuracy of the imaging algorithm over time. Federated learning is a method of aggregating data to improve machine learning algorithms, without transferring the data to an external machine learning server. According to some embodiments, presently disclosed system provides the software that will reside on the data repository of the person using the multimode imaging system. It will analyze images and perform machine learning on those images to improve the parameters of a deployable image analysis algorithm, without transferring any confidential data to where the algorithm will be deployed.

According to some embodiments, presently disclosed system provides telehealth integration and/or integration into electronic health record of image analysis data of multiple biomarkers. Example of biomarkers are temperature, oxygenation, vascularization, redox ratio, infection maps.

According to some embodiments, presently disclosed system provides source of light coherent and incoherent, scanning mechanical and non-mechanical.

According to some embodiments, presently disclosed system provides integration of wound imaging, and swab based bacterial analysis (McGill or similar lab on chip methods).

According to some embodiments, presently disclosed system provides integration of "field of view" imaging with point measurement methods. Field of view imaging is the measurement of an area of an anatomical region. While field of view imaging can be challenging and costly to make measurements with high specificity, it can often be optimized for good sensitivity over a large field of view. In contrast, point measurement systems can provide lower cost and more accurate and in-depth information about a single point on an anatomical surface. The integration of field of view imaging with point measurement, uses the speed and sensitivity of the multimode imaging system to locate an area of interest where a point measurement could be taken. This may improve many aspects of care. Examples of point measurements include swab-based measurements, where a swab is applied to a surface followed by microbiological culture, DNA analysis, or other chemical forms of analysis. Point measurements can also include point spectroscopy, where an optical measurement is taken and analyzed for in-depth characteristics using spectral properties. Point spectroscopy can also comprise a multimode point measurement spectroscopy system. Another form of point measurement is tissue biopsy, in which a small sample of tissue is extracted and analyzed for histological features such as cell structure. Another form of point measurement is liquid sampling, where small samples of extracellular fluid, blood or lymph are extracted for further kinds of analysis. Other types of point measures can include monitoring of temperature and skin conductivity as well as ultrasound measurements.

According to some embodiments, presently disclosed system provides integration of multimode spectroscopy and multimode imaging for more specific analysis.

According to some embodiments, presently disclosed system can be used both for sensing and for other purposes such as treatment. Methods of using light for treatment can include activating phototherapeutic drugs, providing specialized combinations of illumination wavelengths that maybe needed to trigger polymerization or other forms of activation of polymers or polymer substrates (e.g., curing UV epoxies), or optical triggering of drug release by initiating breakdown of drug encapsulation systems.

The same illumination light used to capture tissue information can also be applied in certain cases to activate therapeutic agents, such as phototherapy drugs, in the multimode optical imaging systems.

According to some embodiments, presently disclosed system provides finger print scanners, barcode reader, facial recognition for operator and/or patient part of tamper proof mechanism. According to some embodiments, presently disclosed system can reliably identify the patient, the system's operator, or attending physician when images are captured. Ways to accomplish this include incorporation of biometric recognition systems, such as fingerprint scanners and/or facial recognition for operators, patients, and attending clinicians. It can also include barcode reading systems or RFID reading systems. This information can be incorporated with the image data for future verification of attending personnel and so that the measurements are accurately linked to the correct patient. According to some embodiments, presently disclosed system may provide temper proofing to assure that inappropriate personnel will not be able to use the technology.

According to some embodiments, presently disclosed system provides classification algorithm to authenticate reimbursement/billing eligibility and/or approval procedure. When assessing skin injuries, presently disclosed system may classify the nature of an injury or a chronic problem in order to authenticate reimbursement, billing eligibility, and approval of procedures. For instance, differentiating between treatment for burns versus treatment for chronic skin conditions, such as psoriasis or eczema. According to some embodiments, presently disclosed system allows to accurately document and classify the nature of the skin injury being treated provides a disincentive for this type of falsification.

According to some embodiments, presently disclosed system may be used for ulcer prevention, detection of pre-inflammation, etc. According to some embodiments, presently disclosed system may be used for limb 3D topography, skin health cutaneous and subcutaneous properties, fitting prostatic. According to some embodiments, presently disclosed system may be used for plastic surgery, wound hip replacement, spine surgery wounds. According to some embodiments, presently disclosed system may be used for skin tissue, wound, and or scar analysis of impact of external objects or exposure with skin condition. According to some embodiments, presently disclosed system may be used for postmortem skin tissue analysis.

As Point Feature representations/Histogram (PFH) go, surface (i.e. surface containing wound and/or burn) normal and curvature estimates are somewhat basic in their representations of the geometry around a specific point. The goal of the PFH formulation is to encode a point's k-neighborhood geometrical properties by generalizing the mean curvature around the point using a multi-dimensional histogram of values. This highly dimensional hyperspace provides an informative signature for the feature representation, is invariant to the 6 degrees of freedom pose of the underlying surface, and copes very well with different sampling densities or noise levels present in the neighborhood. The following features of FPH may be used in 3D mapping of the wound features: 1) Fast Point Feature Histograms (FPFH) for 3D registration, 2) optimizations of the PFH computations that reduce runtime drastically by reordering the dataset and caching previously computed values; and/or 3) The PFH selection criterion at a given scale is motivated by the fact that in a given metric space, one can compute the distances from the mean PFH of a dataset to all the features of that dataset. More details can be found in an article by R. B. Rusu, N Blodow and M. Beetz, "Fast Point Feature Histograms (FPFH) for 3D registration," 2009 IEEE International Conference on Robotics and Automation, 2009, pp. 3212-3217, doi 10.1109/ROBOT.2009.5152473, which is incorporated herein by reference in its entirety.

A digital orthophoto Imagimg (DOI)—or any orthoimage—is a computer-generated image of wound imaging photograph in which displacements (distortions) caused by terrain relief and camera tilts have been removed. It combines the image characteristics of a photograph with the geometric qualities of a map. Ortho Imaging techniques, borrowed from GIS and other fields may be utilized for efficient wound mapping. DOI may be used: 1) to measurement of 3D coordinates using orthorectified stereo images; 2) for multispectral analysis, visualisation and animation, and improved manual feature classification; 3) for detection and correction of DTM (Digital Terrain Model) errors; and/or 4) for processing input images, writing the ortho-image channels, and grey level interpolation More details can be found in an article by Emmanuel P. Baltsavias, Digital ortho-images—A powerful tool for the extraction of spatial- and geo-information, ISPRS Journal of Photogrammetry and Remote Sensing, Volume 51, Issue 2, 1996, Pages 63-77, ISSN 0924-2716, which is incorporated herein by reference in its entirety.

Image-based data integration in eHealth and life sciences is typically concerned with the method used for anatomical space mapping, needed to retrieve, compare and analyze large volumes of biomedical data. In mapping one image onto another image, a mechanism is used to match and find the corresponding spatial regions which have the same meaning between the source and the matching image. Image-based data integration is useful for integrating data of various information structures. There is a broad range of issues related to data integration of various information structures, review exemplary work on image representation and mapping, and discuss the challenges that these techniques may bring. Spatial relations as mapping primitives. Metric relations describe the value of the quantitative distance between two spatial entities. Distance can be measured, and it specifies how far is the entity away from the reference entity. Directional relations are usually described between two spatial entities that do not overlap. Approximation for these relations can be done by comparing entities representative points (also called centroid) or their minimum bounding boxes. These relations are often described based on cardinal directions between two spatial entities. Fiducial points: image processing-based mappings. Two types of mapping primitives using spatial relations and fiducial points. Ontology-based mappings may use spatial relations, whilst image processing-based mappings may use fiducial points. These two types of mapping primitives are able to determine corresponding anatomical regions across images. More details can be found in an article by Mohd Zaizi N J, Awang Iskandar D N. Using image mapping towards biomedical and biological data sharing. Gigascience. 2013 Sep. 23; 2(1):12 doi: 10.11862047-217X-2-12. PMID: 24059352, PMCID: PMC3852063, which is incorporated herein by reference in its entirety.

Measuring ground features in imagery, called "image mensuration", is a function in many image interpretation or feature compilation and applications. Image mensuration is defined as applying geometric rules to determine distance, area of a 2-dimensional or 3-dimensional surfaces using the information obtained from lines and angles. It also includes measuring the height and absolute location of a feature Mensuration (aka: repeat, period, Retake etc.) mapping/ analysis include point distance, area, centroid, height, shadow height, 3D point, 3D area and volume. These will increase the accuracy of measurements in 3D morphological measurements and mapping. According to some embodiments, these techniques are being applied to wound feature analysis and mapping. More details can be found in an article by Fraser, Clive S. et al. "Precision Target Mensuration in Vision Metrology.", O. Univ. Prof. Dipl.-Ing. Dr. techn. Karl Kraus E122, Institut für Photogrammetrie und Fernerkundung, TU-Wien, which is incorporated herein by reference in its entirety.

When human eyes see near things they look bigger as compare to those who are far away. This is called perspective in a general way. Whereas transformation is the transfer of an object etc from one state to another So overall, the perspective transformation deals with the conversion of 3d world into 2d image. Some of the data augmentation techniques used for images are: Position augmentation Scaling. Cropping. Flipping. Padding. Rotation. Translation. Affine transformation. Color augmentation. Brightness Contrast. Saturation. These applications are suitable for AI/ML and automated image processing presently disclosed. More details can be found in an article by K. Wang, B. Fang, J. Qian, S. Yang, X. Zhou and J. Zhou, "Perspective Transformation Data Augmentation for Object Detection," in IEEE Access, vol 8, pp. 4935-4943, 2020, doi: 10.1109/ACCESS.2019.2962572, which is incorporated herein by reference in its entirety.

Convolution is a mathematical operation which is fundamental to many common image processing operators. Convolution provides a way of 'multiplying together' two arrays of numbers, generally of different sizes, but of the same dimensionality and used for image reconstruction in various imaging modality. The images reconstructed by convolution/filtering is superior in quality compared with those reconstructed by existing. More details can be found in an article by Mondal P P, Rajan K, Ahmad I. Filter for biomedical imaging and image processing. J Opt Soc Am A Opt Image Sci Vis. 2006 July; 23(7):1678-86. doi 10.1364/josaa 23.001678 PMID: 16783431, which is incorporated herein by reference in its entirety.

More details about multimode imaging for skin analysis and reducing effect of melanin on measurement of tissue oxygenation can be found in an article by F Vasefi, et al, Polarization-sensitive hyperspectral imaging in vivo: a multimode dermoscope for skin analysis, Scientific reports 4 (1), 1-10, (2014), which is incorporated herein by reference in its entirety. May also be found in an article by F Vasefi, et al, Separating melanin from hemodynamics in nevi using multimode hyperspectral dermoscopy and spatial frequency domain spectroscopy, Journal of biomedical optics 21 (11), 114001 (2016), which is incorporated herein by reference in its entirety. May also be found in an article by F Vasefi et al., Toward in vivo diagnosis of skin cancer using multimode imaging dermoscopy: (II) molecular mapping of highly pigmented lesions, Imaging, Manipulation, and Analysis of Biomolecules, Cells, and Tissues XII, (2014), which is incorporated herein by reference in its entirety.

More details about various hyperspectral and multimode spectral imaging for skin analysis can be found in an article by F Vasefi et al., Hyperspectral and multispectral imaging in dermatology, Imaging in Dermatology, 187-201, (2016), which is incorporated herein by reference in its entirety.

More details about combination of mobile imaging with clinical scanner for skin and wound monitoring can be found in an article by N MacKinnon et al, Melanoma detection using smartphone and multimode hyperspectral imaging, Imaging, Manipulation, and Analysis of Biomolecules, Cells, and Tissues IX (2016), which is incorporated herein by reference in its entirety. May also be found in an article by N Alamdari et al, Effect of lesion segmentation in melanoma diagnosis for a mobile health application, Frontiers in Biomedical Devices 40672, V001T12A005, (2017), which is incorporated herein by reference in its entirety.

More details about using time-resolved fluorescence imaging and detection of multiple fluorescence biomarkers can be found in an article by F. Vasefi et al, Real time optical biopsy: time-resolved fluorescence spectroscopy instrumentation and validation, Journal of biomedical optics 21 (11), 114001 (2016), which is incorporated herein by reference in its entirety.

More details about identifying foot and body landmark and image registration can be found in an article by F Akhbardeh et al, Toward development of mobile application for hand arthritis screening, 2015 37th Annual International Conference of the IEEE Engineering in Biology (2015), which is incorporated herein by reference in its entirety May also be found in an article by M Amini et al, Validation of hand and foot anatomical feature measurements from smartphone images, Imaging, Manipulation, and Analysis of Biomolecules, Cells, and Tissues XVI, (2018), which is incorporated herein by reference in its entirety.

More details describing multimode imaging being complementary measuring biomarkers with more accuracy can be found in an article by F Vasefi et al, Multimode hyperspectral imaging for food quality and safety, Hyperspectral Imaging in Agriculture, Food and Environment (2018), which is incorporated herein by reference in its entirety.

More details describing optical imaging scanner calibration using tissue mimicking phantom can be found in an article by F Vasefi et al, Quantifying the optical properties of turbid media using polarization sensitive hyperspectral imaging (SkinSpect): Two-layer optical phantom studies, Imaging, Manipulation, and Analysis of Biomolecules, Cells, and Tissues XIII (2015), which is incorporated herein by reference in its entirety.

More details describing computer algorithm detecting lesion boundary including infection and inflammation using smartphone can be found in an article by F Vasefi et al, Vanishing point: a smartphone application that classifies acne lesions and estimates prognosis, Imaging, Manipulation, and Analysis of Biomolecules, Cells, and Tissues IX (2016), which is incorporated herein by reference in its entirety. May also be found in an article by F Vasefi et al, A smartphone application for psoriasis segmentation and classification, Imaging, Manipulation, and Analysis of Biomolecules, Cells, and Tissues XV (2017), which is incorporated herein by reference in its entirety.

More details describing computer algorithm automatic detecting fluorescence from bacterial load using machine learning algorithms can be found in an article by HT Gorji et al, Combining deep learning and fluorescence imaging to automatically identify fecal contamination on meat carcasses, Scientific Reports 12 (1), 1-11, (2022), which is incorporated herein by reference in its entirety. May also be found in an article by M Sueker et al, Handheld multispectral fluorescence imaging system to detect and disinfect surface contamination, Sensors 21 (21), 7222 (2021), which is incorporated herein by reference in its entirety. May also be found in an article by HT Gorji et al, Deep learning and multiwavelength fluorescence imaging for cleanliness assessment and disinfection in Food Services, Frontier in Sensors (2022), which is incorporated herein by reference in its entirety.

More details describing computer algorithm identifying optimum wavelength for image classification can be found in an article by J Chauvin et al, Simulated Annealing-Based Wavelength Selection for Robust Tissue Oxygenation Estimation Powered by the Extended Modified Lambert-Beer Law, Applied Sciences Applied Sciences 12 (17), 8490 (2022), which is incorporated herein by reference in its entirety. May also be found in an article by J Chauvin et al, Simulated Annealing-Based Hyperspectral Data Optimization for Fish Species Classification: Can the Number of Measured Wavelengths Be Reduced? Applied Sciences 11 (22), 10628 (2021), which is incorporated herein by reference in its entirety. May also be found in an article by J Chauvin et al, Hyperspectral band selection for food fraud application using self-organizing maps (SOM), SPIE Future Sensing Technologies 11525, 201-211 (2020), which is incorporated herein by reference in its entirety.

More details describing fusion AI computer algorithm combining multimode spectral data analysis for classification can be found in an article by R Duran et al, Multimode hyperspectral data fusion for fish species identification using supervised and reinforcement learning, Sensing for Agriculture and Food Quality and Safety XII 11421, 95-103 (2020), which is incorporated herein by reference in its entirety.

More details describing calibration and variability analysis of fluorescence signal can be found in an article by N Marin et al, Calibration standards for multicenter clinical trials of fluorescence spectroscopy for in vivo diagnosis, Journal of Biomedical Optics 11 (1), 014010, (2006), which is incorporated herein by reference in its entirety. May also be found in an article by BM Pikkula et al, Instrumentation as a source of variability in the application of fluorescence spectroscopic devices for detecting cervical neoplasia, Journal of Biomedical Optics 12 (3), 034014 (2007), which is incorporated herein by reference in its entirety. May also be found in an article by J S Lee et al, Design and preliminary analysis of a study to assess intra-device and inter-device variability of fluorescence spectroscopy instruments for detecting cervical neoplasia, Gynecologic oncology 99 (3), S98-S111 (2005), which is incorporated herein by reference in its entirety. May also be found in an article by BM Pikkula et al, Multicenter clinical trials of in-vivo fluorescence: are the measurements equivalent?, Advanced Biomedical and Clinical Diagnostic Systems V 6430, 329-339 (2007), which is incorporated herein by reference in its entirety.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another, i.e. may include transitory and/or non-transitory computer readable media. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While several illustrative embodiments of the invention have been shown and described, numerous variations and alternative embodiments will occur to those skilled in the art. Such variations and alternative embodiments are contemplated, and can be made without departing from the scope of the invention as defined in the appended claims.

As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ."

What is claimed is:

1. A system for assessing biological tissue, the system comprising:
    an illumination hardware arrangement comprising transmission and sensing hardware, the illumination hardware arrangement configured to inspect a biological tissue using at least two modes from a group comprising:
    a three dimensional stereo imaging mode;
    a fluorescence imaging mode;
    a hyperspectral imaging mode; and
    a thermal imaging mode; and
    the system further comprising one or more 3D stereoscopic imaging cameras, wherein each stereoscopic imaging camera includes two sensors spaced a known distance apart such that each stereoscopic imaging camera takes two images from the two sensors and compares them to provide morphological information; and
    the system further comprising one or more thermal imaging cameras to provide at least one of IR images and thermal images; and
    processing hardware configured to operate the illumination hardware arrangement according to a protocol comprising inspection settings of the at least two modes, wherein the processing hardware receives scan results for the at least two modes from the illumination hardware arrangement and identifies attributes of the biological tissue by constructing a three dimensional dataset from the scan results for the at least two modes and analyzing the three dimensional dataset.

2. The biological tissue inspection apparatus of claim 1, wherein the biological tissue comprises a wound on a patient's skin.

3. The biological tissue inspection apparatus of claim 1, wherein the processing hardware comprises a processor, at least one trained artificial intelligence module, and at least one classifier.

4. The biological tissue inspection apparatus of claim 1, wherein the biological tissue comprises a burn on a patient's skin.

5. The biological tissue inspection apparatus of claim 1, wherein the protocol is determined in part based on an identification of particular attributes expected to be associated with the biological tissue when examined using the at least two modes.

6. The biological tissue inspection apparatus of claim 1, wherein the system determines presence of infection associated with the biological tissue.

7. The biological tissue inspection apparatus of claim 1, wherein the identified attributes are infection associated with the biological tissue.

8. The biological tissue inspection apparatus of claim 1, wherein the identified attributes are metabolic biomarkers associated with the biological tissue.

9. The biological tissue inspection apparatus of claim 1, wherein the illumination hardware comprises one or more pulsating light sources to reduce ambient light sources for the at least two modes.

10. The biological tissue inspection apparatus of claim 1, wherein the identified attributes are collagen associated with the biological tissue.

11. The biological tissue inspection apparatus of claim 1, wherein the identified attributes are oxygenation associated with the biological tissue.

12. The biological tissue inspection apparatus of claim 1, wherein the system identifies treatment based on the three dimensional dataset.

13. The biological tissue inspection apparatus of claim 1, wherein the system identifies billing code based on the three dimensional dataset.

14. The biological tissue inspection apparatus of claim 1, wherein the system identifies treatment based on the three dimensional dataset.

15. The biological tissue inspection apparatus of claim 2, wherein the system classifies the wound based on the three dimensional dataset.

16. The biological tissue inspection apparatus of claim 4, wherein the system classifies the burn based on the three dimensional dataset.

* * * * *